US011284324B1

(12) United States Patent
Somashekar et al.

(10) Patent No.: US 11,284,324 B1
(45) Date of Patent: Mar. 22, 2022

(54) LOW-LATENCY WIRELESS DATA SERVICE IN A FIFTH GENERATION NEW RADIO (5GNR) NETWORK

(71) Applicant: Sprint Communications Company L.P., Overland Park, KS (US)

(72) Inventors: Sharath Somashekar, Overland Park, KS (US); Shruthi Ramakrishna, Overland Park, KS (US); Nitesh Manchanda, Overland Park, KS (US); Vanil Parihar, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 174 days.

(21) Appl. No.: 16/511,568

(22) Filed: Jul. 15, 2019

(51) Int. Cl.
*H04W 48/08* (2009.01)
*H04W 36/30* (2009.01)
*H04W 36/00* (2009.01)
*H04W 36/08* (2009.01)
*H04W 48/00* (2009.01)
*H04W 8/08* (2009.01)
*H04W 28/02* (2009.01)
*H04W 84/04* (2009.01)

(52) U.S. Cl.
CPC ............ *H04W 36/30* (2013.01); *H04W 8/08* (2013.01); *H04W 28/0268* (2013.01); *H04W 36/0007* (2018.08); *H04W 36/08* (2013.01); *H04W 48/17* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 9,949,146 B1* | 4/2018 | Velusamy | H04W 8/082 |
| 10,798,617 B1* | 10/2020 | Ghadge | H04W 36/32 |
| 2016/0174193 A1* | 6/2016 | Zhang | H04W 4/06 370/312 |
| 2016/0277294 A1* | 9/2016 | Akiyoshi | H04L 49/70 |
| 2017/0013421 A1* | 1/2017 | Kodaypak | H04W 72/005 |
| 2018/0007583 A1 | 1/2018 | Hong et al. | |
| 2018/0206258 A1 | 7/2018 | Hosseini et al. | |
| 2019/0036667 A1 | 1/2019 | Wang et al. | |
| 2019/0069325 A1 | 2/2019 | Yerramalli et al. | |
| 2020/0323024 A1* | 10/2020 | Huang | H04W 4/06 |

FOREIGN PATENT DOCUMENTS

| | | |
|---|---|---|
| WO | 2018026392 A1 | 2/2018 |
| WO | 2018044358 A1 | 3/2018 |

\* cited by examiner

*Primary Examiner* — Ajit Patel
*Assistant Examiner* — Pamit Kaur

(57) ABSTRACT

A Fifth Generation New Radio (5GNR) network serves User Equipment (UE) with low-latency Quality-of-Service (QoS). A source 5GNR node receives signaling from the UE and transfers the signaling to a network controller. The network controller processes the signaling to determine a low-latency QoS. A network gateway receives user data and transfers the user data to the source 5GNR node. The source 5GNR node wirelessly transfers the user data to the UE. Responsive to the low-latency QoS, the source 5GNR node transfers multicast signaling to the network controller when received signal strength at the UE reaches a multicast trigger. The network controller transfers multicast signaling to the network gateway. The network gateway multicasts the user data to the source 5GNR node and to neighbor 5GNR nodes.

20 Claims, 13 Drawing Sheets

LOW-LATENCY WIRELESS DATA SERVICE IN A FIFTH GENERATION NEW RADIO (5GNR) NETWORK

TECHNICAL BACKGROUND

Wireless communication networks provide wireless data services to wireless user devices. Exemplary wireless data services include voice-calling, internet-access, and machine communications. Exemplary wireless user devices comprise phones, computers, drones, and robots. The wireless communication networks have wireless access nodes that exchange wireless signals with the wireless user devices. The wireless communication devices detect wireless signals that are broadcast by the wireless access nodes, and a given wireless communication device generally attaches to the wireless access node that has the strongest signal. The wireless user devices continually measure and report signal strengths for wireless access points that they detect.

A wireless access node that serves a wireless user device is referred to as the source access node. As the wireless user device moves about, the source access node determines when another "target" access node has better signal strength at the wireless user device. When a target access node has better signal strength than the source access node, the source access node transfers handover signaling to the wireless user device and the target access node to initiate the handover. The wireless user device attaches to the target access node and detaches from the source access node to perform the handover responsive to the handover signaling. Unfortunately, the handover delays the delivery of the user data.

5GNR networks feature low-latency communications which have minimal delay between data packets. 5GNR access nodes may struggle to maintain the low-latency communications during handovers. The 5GNR handover latency issue is exacerbated when Long Term Evolution (LTE) access nodes are used to support the 5GNR access nodes during the handovers.

TECHNICAL OVERVIEW

A Fifth Generation New Radio (5GNR) network serves User Equipment (UE) with low-latency Quality-of-Service (QoS). A source 5GNR node receives signaling from the UE and transfers the signaling to a network controller. The network controller processes the signaling to determine a low-latency QoS. A network gateway receives user data and transfers the user data to the source 5GNR node. The source 5GNR node wirelessly transfers the user data to the UE. Responsive to the low-latency QoS, the source 5GNR node transfers multicast signaling to the network controller when received signal strength at the UE reaches a multicast trigger. The network controller transfers multicast signaling to the network gateway. The network gateway multicasts the user data to the source 5GNR node and to neighbor 5GNR nodes.

DETAILED DESCRIPTION

Figure 1:
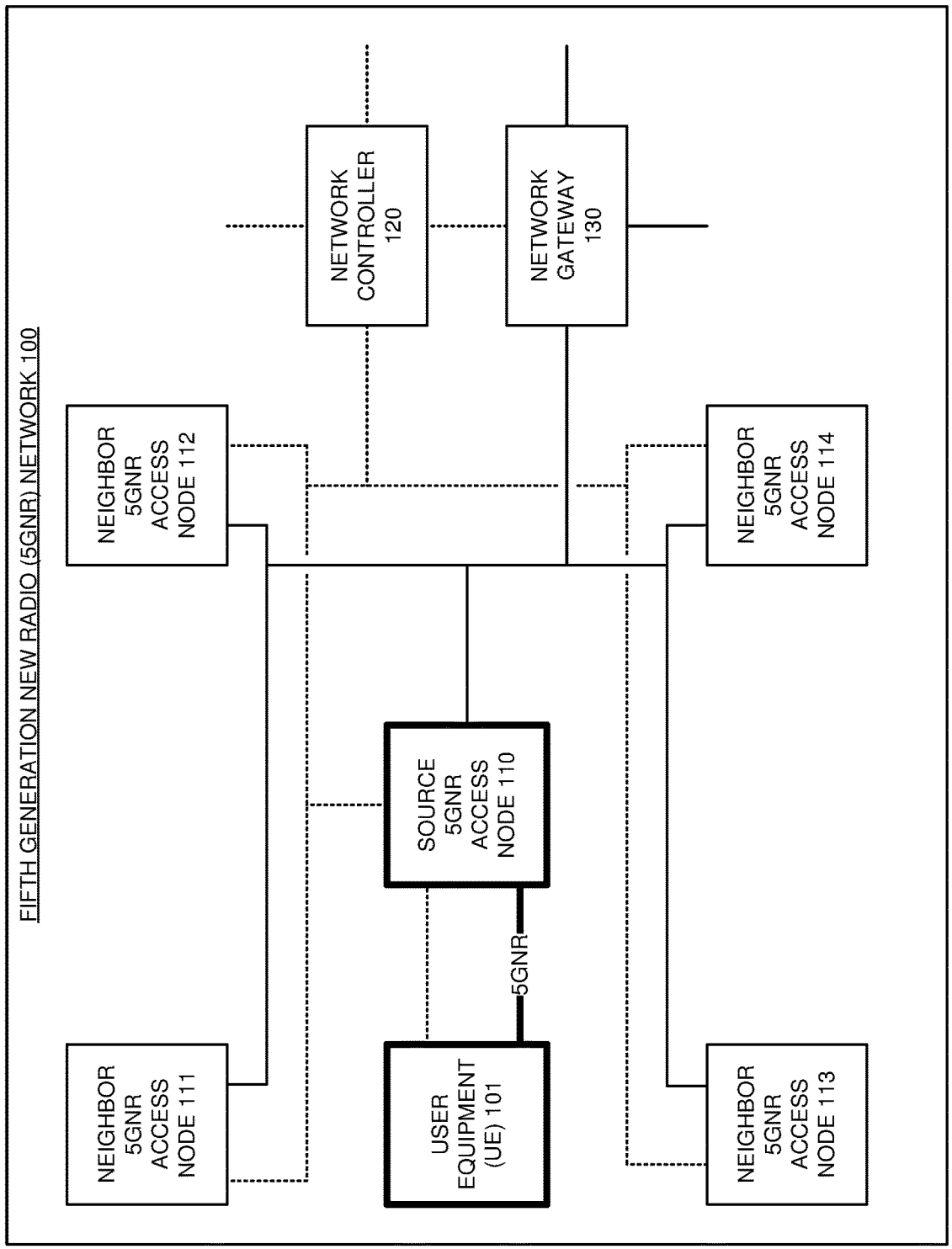
FIG. 1 illustrates a Fifth Generation New Radio (5GNR) network to serve User Equipment (UEs) with a low-latency Quality-of-Service (QoS).

FIG. 1 illustrates Fifth Generation New Radio (5GNR) network 100 to serve User Equipment (UE) 101 with a wireless data service having a low-latency Quality-of-Service (QoS). 5GNR network 100 comprises UE 101, 5GNR access nodes 110-114, network controller 120, and network gateway 130. 5GNR network 100 serves UE 101 with wireless data services like media-streaming, social-networking, machine communications, vehicle control, and/or some other user application. UE 101 might comprise a phone, computer, robot, vehicle, sensor, or some other apparatus with communication circuitry.

Source 5GNR access node 110 will hand UE 101 over to a target one of neighbor 5GNR access nodes 111-114. Before the UE handover, network gateway 130 transfers user data to source 5GNR access node 110, and source 5GNR access node 110 wirelessly transfers the user data to UE 101. To maintain the low-latency QoS, network gateway 130 and/or source 5GNR access node 110 multicast the user data to neighbor 5GNR access nodes 111-114 during the handover. Neighbor 5GNR access nodes 111-114 receive and store the user data from the multicast. After the handover, the target one of neighbor 5GNR access nodes 111-114 wirelessly transfers this stored user data to UE 101 over a 5GNR link. Eventually, network gateway 130 and/or node 110 terminate the multicast and network gateway 130 transfers subsequent user data to the target one of neighbor 5GNR access nodes 111-114. The target one of neighbor 5GNR access nodes 111-114 wirelessly transfers this subsequent user data to UE 101 over a 5GNR link. Advantageously, the multicast of user data during the UE handover mitigates latency caused by the handover.

UE 101 and source 5GNR access node 110 are coupled over a 5GNR data link and over a network signaling link. These wireless links may use wireless spectrum in the low-band, mid-band, millimeter wave band, and/or some other radio band. 5GNR access nodes 110-114 are coupled to one another over data links and signaling links. Network controller 120 is coupled to 5GNR access nodes 110-114 and to network gateway 130 over signaling links. Network gateway 130 is coupled to 5GNR access nodes 110-114 and to other systems over data links. Network controller 120 comprises an Access and Mobility Management Function (AMF), Session Management Function (SMF), Authentication Server Function (AUSF), Mobility Management Entity (MME), Home Subscriber System (HSS), Policy Charging and Rules Function (PCRF), and/or some other network signaling processor. Network gateway 130 comprises a User Plane Function (UPF), Serving Gateway (S-GW), Packet Data Network Gateway (P-GW), and/or some other network data processor.

Source 5GNR access node 110 comprises antennas, modulators, amplifiers, filters, digital/analog interfaces, microprocessors, memory, software, and bus connections. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disk drives, and/or the like. The memories store the software like operating systems, network applications, and possibly virtual components. The virtual components may comprise hypervisors, containers, virtual switches, virtual microprocessors, virtual memories, virtual Network Interface Cards (NICs) and/or the like.

In source 5GNR access node 110, the microprocessors execute the operating systems and network applications to wirelessly exchange network signaling with UE 101 over the signaling link and to wirelessly exchange user data with UE 101 over the 5GNR link. The microprocessors execute the operating systems and network applications to exchange network signaling with neighbor 5GNR access points 111-114 and network controller 120 over signaling links. The microprocessors execute the operating systems and network applications to exchange user data with neighbor 5GNR access points 111-114 and network gateway 130 over data links. Exemplary network applications comprise Physical Layer (PHY), Media Access Control (MAC), Radio Link Control (RLC), Packet Data Convergence Protocol (PDCP), Radio Resource Control (RRC), Service Data Adaptation Protocol (SDAP), and Common Public Radio Interface (CPRI).

In operation, UE 101 wirelessly transfers attachment signaling to source 5GNR access node 110. Source 5GNR access node 110 wirelessly receives the attachment signaling from UE 101 and transfers attachment signaling to network controller 120. Network controller 120 processes the attachment signaling to determine a low-latency QoS for UE 101. For example, network controller 120 may translate a network identifier like a Public Land Mobile Network Identifier (PLMN ID) that was received from UE 101 into the low-latency QoS. Network controller 120 transfers network signaling to source 5GNR access node 110 and network gateway 130 indicating the low-latency QoS for UE 101. The network signaling might indicate a QoS Class Indicator (QCI) for the low-latency data service. Network gateway 130 receives user data for UE 101 and transfers the user data to source 5GNR access node 110 responsive to the network signaling. Source 5GNR access node 110 wirelessly transfers the user data to UE 101 over the 5GNR link responsive to the network signaling.

In response to the low-latency QoS, source 5GNR access node 110 determines when the received signal strength at UE 101 reaches a multicast trigger level. Source 5GNR access node 110 transfers multicast signaling to network controller 120 when the received signal strength at UE 101 reaches the multicast trigger. Network controller 120 transfers multicast signaling to network gateway 130 responsive to the multicast signaling from source 5GNR access node 110. Network gateway 130 multicasts the user data to source 5GNR access node 110 and neighbor 5GNR access nodes 111-114 responsive to the multicast signaling from network controller 120.

Source 5GNR access node 110 determines when the received signal strength at UE 101 reaches a handover trigger level. The handover trigger level is lower than the multicast trigger level. When the received signal strength at UE 101 reaches the handover trigger level, source 5GNR access node 110 selects a target one of neighbor 5GNR access nodes 111-114. Source 5GNR access node 110 transfers handover signaling to network controller 120 and to the selected target one of neighbor 5GNR access nodes 111-114. Network controller 120 transfers handover signaling to network gateway 130 responsive to the handover signaling from source 5GNR access node 110. Network gateway 130 terminates the user data multicast and transfers the user data to the target one of neighbor 5GNR access nodes 111-114 responsive to the handover signaling from network controller 120.

In some examples, source 5GNR access node 110 multicasts the user data to neighbor 5GNR access points 111-114 over data links when the received signal strength at UE 101 reaches the multicast trigger instead of (or in addition to) network gateway 130. The multicast signaling between source 5GNR access node 110, network controller 120, and network gateway 130 may be avoided. When the received signal strength at UE 101 reaches the handover trigger level, source 5GNR access node 110 terminates the user data multicast, and network gateway 130 transfers the subsequent user data to the target one of neighbor 5GNR access nodes 111-114.

In some examples, source 5GNR access point 110 uses a Long Term Evolution (LTE) evolved NodeB (eNodeB) to exchange network signaling with UE 101, network controller 120, and neighbor 5GNR access points 111-114. Source 5GNR access point 110 may also use the LTE eNodeB to exchange user data with network gateway 130 and neighbor 5GNR access points 111-114. Neighbor 5GNR access points 111-114 may use LTE eNodeBs in a similar manner.

Figure 2:
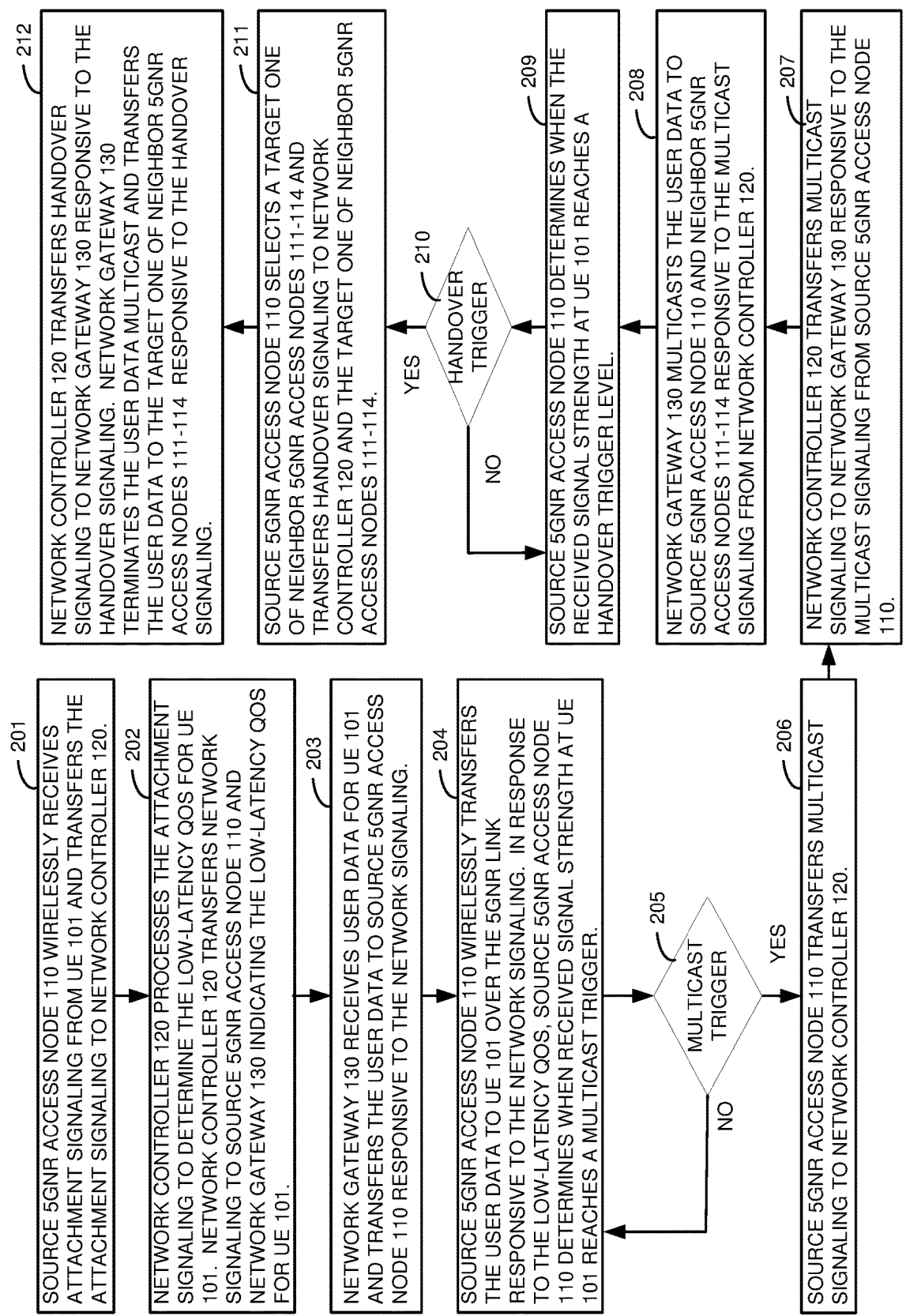
FIG. 2 illustrates the operation of the 5GNR network to serve the UEs with the low-latency QoS.

FIG. 2 illustrates the operation of 5GNR network 100 to serve UE 101 with low-latency QoS. Source 5GNR access node 110 wirelessly receives attachment signaling from UE 101 and transfers the attachment signaling to network controller 120 (201). Network controller 120 processes the attachment signaling to determine the low-latency QoS for UE 101 (202). Network controller 120 transfers network signaling to source 5GNR access node 110 and network gateway 130 indicating the low-latency QoS for UE 101 (202). Network gateway 130 receives user data for UE 101 and transfers the user data to source 5GNR access node 110 responsive to the network signaling (203). Source 5GNR access node 110 wirelessly transfers the user data to UE 101 over the 5GNR link responsive to the network signaling (204). In response to the low-latency QoS, source 5GNR access node 110 determines when the received signal strength at UE 101 reaches a multicast trigger level (204).

When the received signal strength at UE 101 reaches the multicast trigger level (205), source 5GNR access node 110 transfers multicast signaling to network controller 120 (206). Network controller 120 transfers multicast signaling to network gateway 130 responsive to the multicast signaling from source 5GNR access node 110 (207). Network gateway 130 multicasts the user data to source 5GNR access node 110 and neighbor 5GNR access nodes 111-114 responsive to the multicast signaling from network controller 120 (208). Network gateway 130 multicasts the user data to source 5GNR access node 110 and neighbor 5GNR access nodes 111-114 responsive to the multicast signaling from network controller 120 (208). If the received signal strength at UE 101 rises above the multicast trigger level, then source 5GNR access node 110 transfers multicast signaling to network controller 120, and network controller 120 transfers multicast signaling to network gateway 130 to stop the multicast. A multicast hysteresis may be used to avoid a ping-pong multicast effect.

Source 5GNR access node 110 determines when the received signal strength at UE 101 reaches a handover trigger level (209). When the received signal strength at UE 101 reaches the handover trigger level (210), source 5GNR access node 110 selects a target one of neighbor 5GNR access nodes 111-114 and transfers handover signaling to network controller 120 and the target one of neighbor 5GNR access nodes 111-114 (211). Responsive to the handover signaling from source 5GNR access node 110, network controller 120 transfers handover signaling to network gateway 130 (212). Network gateway 130 terminates the user data multicast and transfers the user data to the target one of neighbor 5GNR access nodes 111-114 responsive to the handover signaling (212).

Figure 3:
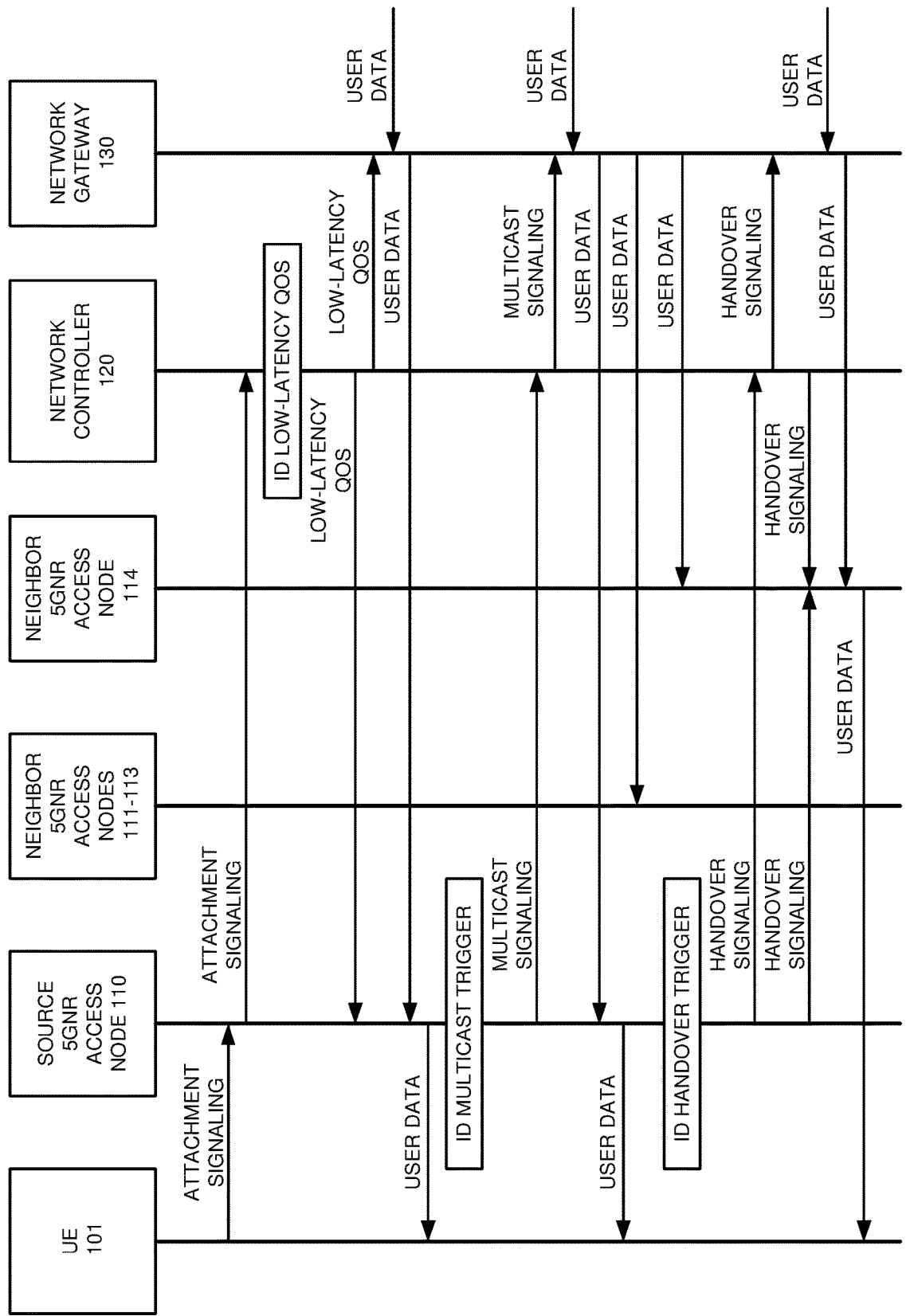
FIG. 3 illustrates the operation of the 5GNR network to serve the UE with the low-latency QoS.

FIG. 3 illustrates the operation of 5GNR network 100 to serve UE 101 with the low-latency QoS. UE 101 transfers attachment signaling to source 5GNR access node 110. Source 5GNR access node 110 transfers attachment signaling for UE 101 to network controller 120. Network controller 120 processes the attachment signaling to identify a low-latency QoS for UE 101. Network controller 120 transfers network signaling to source 5GNR access node 110 and network gateway 130 indicating the low-latency QoS for UE 101. Network gateway 130 receives user data for UE 101 and transfers the user data to source 5GNR access node 110 responsive to the network signaling. Source 5GNR access node 110 wirelessly transfers the user data to UE 101 over the 5GNR link responsive to the network signaling.

In response to the low-latency QoS, source 5GNR access node 110 identifies when the received signal strength at UE 101 falls to the multicast trigger level. When the received signal strength at UE 101 reaches the multicast trigger level, source 5GNR access node 110 transfers multicast signaling to network controller 120. The multicast signaling indicates neighbor access nodes 111-114 which are selected because they have sufficient signal power to accept a handover of UE 101. Network controller 120 transfers multicast signaling to network gateway 130 responsive to the multicast signaling from source 5GNR access node 110. Network gateway 130 multicasts the user data to source 5GNR access node 110 and neighbor 5GNR access nodes 111-114 responsive to the multicast signaling from network controller 120. If the received signal strength at UE 101 were to rise above the multicast trigger level, then source 5GNR access node 110 transfers multicast signaling and network gateway 130 stops the multicast.

Source 5GNR access node 110 identifies when the received signal strength at UE 101 falls further to a handover trigger level. When the received signal strength at UE 101 reaches the handover trigger level, source 5GNR access node 110 selects neighbor 5GNR access node 114 as its target (in this example) and transfers handover signaling to network controller 120 and to target 5GNR access node 114. Responsive to the handover signaling from source 5GNR access node 110, network controller 120 transfers handover signaling to network gateway 130. Network gateway 130 terminates the multicast and transfers the user data to target 5GNR access node 114 responsive to the handover signaling. Target 5GNR access node 114 wirelessly transfers the user data to UE 101 responsive to the handover signaling.

Figure 4:
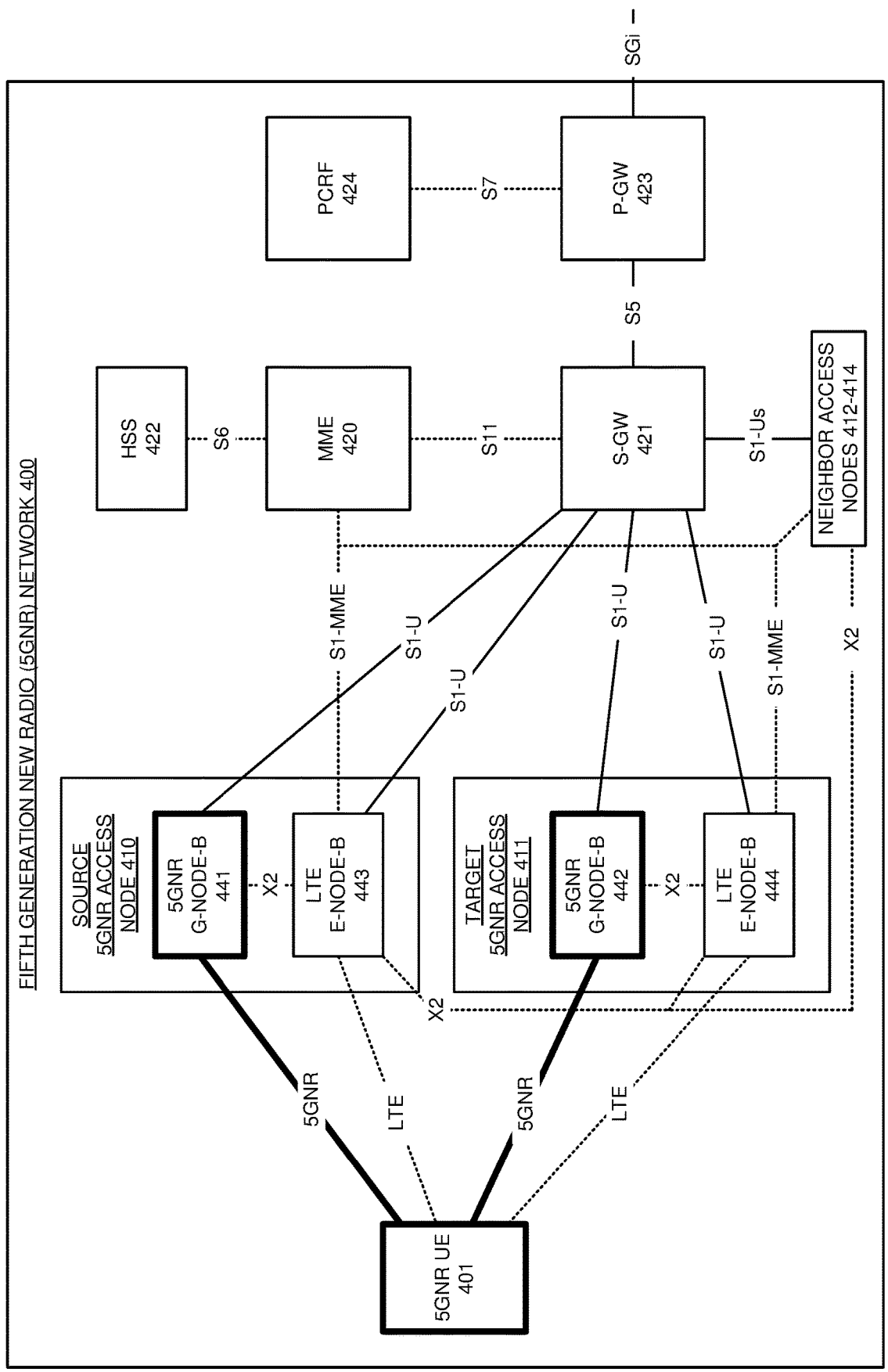
FIG. 4 illustrates a 5GNR network having Long Term Evolution (LTE) eNodeBs to serve UEs with a low-latency QoS.

FIG. 4 illustrates 5GNR network 400 having Long Term Evolution (LTE) eNodeBs 443-444 to serve 5GNR UE 401 with a low-latency QoS. 5GNR/LTE network 400 is an example of 5GNR network 100, although network 100 may differ. 5GNR/LTE network 400 comprises 5GNR UE 401, source 5GNR access node 410, target 5GNR access node 411, Mobility Management Entity (MME) 420, Serving Gateway (S-GW) 421, Home Subscriber System (HSS) 422, Packet Data Network Gateway (P-GW) 423, and Policy Charging and Rules Function (PCRF) 424. Source 5GNR access node 410 comprises 5GNR gNodeB 441 and LTE eNodeB 443. Target 5GNR access node 411 comprises 5GNR gNodeB 442 and LTE eNodeB 444.

Initially, 5GNR UE 401 is coupled to source 5GNR access node 410 with an LTE RRC link to LTE eNodeB 443. UE 101 transfers RRC signaling to LTE eNodeB 443 that indicates: UE ID, Public Land Mobile Network (PLMN) ID, and received signal strength at UE 401 for 5GNR access nodes 410-414. LTE eNodeB 443 transfers the UE ID and PLMN ID to MME 420 over an S1-MME link. MME 420 transfers the UE ID and PLMN ID to HSS 422 over an S6 link. HSS 422 translates the UE ID and the PLMN ID into an Access Point Name (APN) associated with P-GW-423. HSS 422 returns the APN for UE 401 to MME 420. MME 420 transfers the UE ID, PLMN ID, and APN to PCRF 424 over S-GW 421, P-GW 423, and the S11, S5, and S6 links. PCRF 424 translates the PLMN ID and possibly the UE ID into a QoS Class Identifier (QCI) "N" for 5GNR UE 401. QCI N is representative and has metrics and rules for a low-latency wireless data service. PCRF 424 transfers the QCI N to MME 420 over S-GW 421, P-GW 423, and the S11, S5, and S6 links.

MME 420 transfers instructions to create a QCI N bearer for 5GNR UE 401 to S-GW 421 over the S11 link and to LTE eNodeB 443 over the S1-MME link. LTE eNodeB 443 transfers instructions to create the QCI N bearer to 5GNR UE 401 over the RRC link. LTE eNodeB 443 transfers instructions to create the QCI N bearer to 5GNR gNode B 441 over an X2 link. S-GW 421 transfers instructions to create the QCI N bearer to P-GW 423 over an S5 link. P-GW 423 receives user data for 5GNR UE 401 over an SGi link and transfers the user data to S-GW 421 over an S5 link per the QCI N. S-GW 421 transfers the user data to 5GNR gNodeB 441 over an S1-U link per QCI N. 5GNR gNodeB 441 wirelessly transfers the user data to 5GNR UE 101 over the 5GNR SDAP link per QCI N.

LTE eNodeB 443 receives and processes reports from 5GNR UE 401 that indicate received signal strength at UE 401 for 5GNR access nodes 410-414. In response to the QCI N for 5GNR UE 401, LTE eNodeB 443 identifies when the received signal strength at 5GNR UE 401 from source 5GNR access node 410 reaches a multicast trigger level. When the received signal strength at UE 401 reaches the multicast trigger level, LTE eNodeB 443 transfers multicast signaling to MME 420 over the S1-MME link that indicates neighbor access nodes 411-414 that were indicated in the reports from UE 401 as having adequate signal power to serve 5GNR UE 401. MME 420 transfers multicast signaling to S-GW 421 over the S11 link that indicates neighbor access nodes 411-414. In response to the multicast signaling, S-GW 421 multicasts the user data from P-GW 423 for UE 401 to 5GNR access nodes 410-411 over S1-U links. 5GNR gNodeB 441 continues to wirelessly transfer the user data to 5GNR UE 401 over the 5GNR link per QCI N.

LTE eNodeB 443 processes the reports from 5GNR UE 401 to determine when the received signal strength at 5GNR UE 401 from source 5GNR access node 410 reaches a handover trigger level. When the received signal strength at UE 401 reaches the handover trigger level, LTE eNodeB 443 selects a target one of neighbor 5GNR access nodes 411-414 based on their signal strength reports from UE 401. In this specific example, LTE eNodeB 443 selects target 5GNR access node 411, but 5GNR access nodes 412-414 might be selected in other examples. LTE eNodeB 443 transfers handover signaling that indicates target 5GNR access node 411 to MME 420 over the S1-MME link. LTE eNodeB 443 transfers handover signaling to LTE eNodeB 444 in target 5GNR access node 411 over an X2 link. MME 420 transfers handover signaling to S-GW 421 over the S11 link to create a QCI N bearer for UE 401. S-GW 421 terminates the multicast to access nodes 410-414 responsive to the handover signaling. MME 420 transfers handover signaling to LTE eNodeB 444 over an S1-MME link to create a QCI N bearer for UE 401. LTE eNodeB 444 transfers instructions for the QCI N bearer to 5GNR gNodeB 442 over an X2 link.

5GNR UE 401 transfers RRC signaling to LTE eNodeB 444 that indicates: UE ID, PLMN ID, QCI N, and received signal strength for 5GNR access nodes 410-414. LTE eNodeB 444 transfers instructions to 5GNR UE 401 over the RRC link to create the QCI N bearer. P-GW 423 receives user data for 5GNR UE 401 over the SGi link and transfers the user data to S-GW 421 over the S5 link per QCI N. S-GW 421 transfers the user data to 5GNR gNodeB 442 over an S1-U link per QCI N. 5GNR gNodeB 442 wirelessly transfers the user data to 5GNR UE 101 over the 5GNR link per QCI N.

In some examples, S-GW 421 does not multicast the user data, but S-GW 421 transfers the user data to 5GNR gNodeB 441—either directly over an S1-U link or indirectly over and S1-U link, eNodeB 443, and an X2 link. LTE eNodeB 443 multicasts the user data to 5GNR access nodes 410-414 over X2 links responsive to the multicast trigger. LTE eNodeB 443 may receive the user data from gNodeB 441 over an X2 link. LTE eNodeB 443 stops the multicast of the user data to 5GNR access nodes 410-414 over the X2 links in response to the handover trigger.

Figure 5:
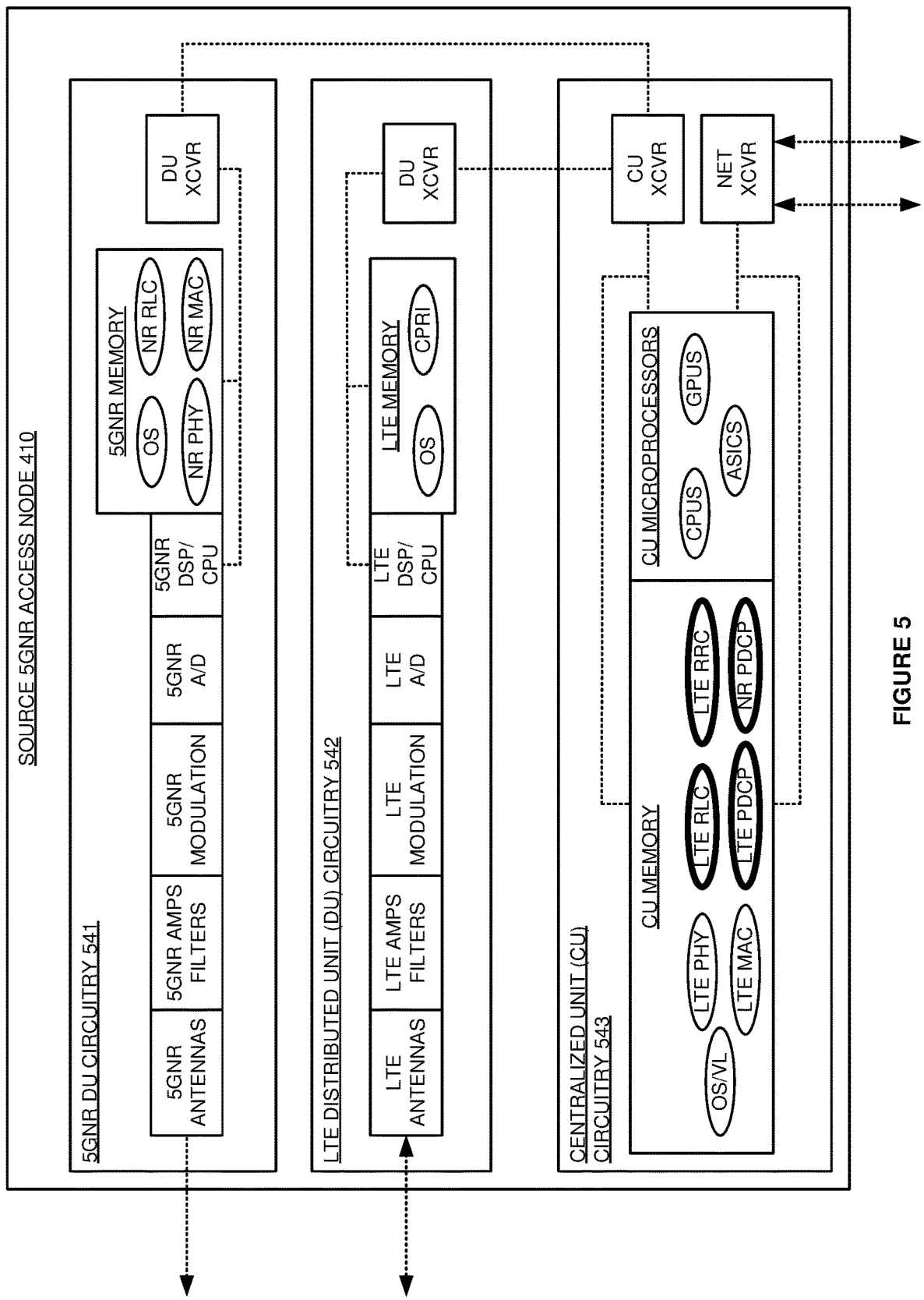
FIG. 5 illustrates a 5GNR access node having the LTE eNodeBs to serve the UEs with the low-latency QoS.

FIG. 5 illustrates 5GNR access node 410 having LTE eNodeB 443 to serve 5GNR UE 401 with the low-latency QoS. 5GNR access node 410 comprises 5GNR Distributed Unit (DU) circuitry 541, LTE DU circuitry 542, and Centralized Unit (CU) circuitry 543. LTE eNodeB 443 is depicted on FIG. 4 and comprises LTE DU circuitry 542 and portions of CU circuitry 543 on FIG. 5. 5GNR gNodeB 441 is depicted on FIG. 4 and comprises 5GNR DU circuitry 541 and portions of CU circuitry 543 on FIG. 5. DU circuitry 541-542 each comprise antennas, amplifiers (AMPS), filters, modulation, Analog-to-Digital (A/D), Digital Signal Processor (DSP), Central Processing Unit (CPU), memory, and DU transceivers (XCVR) that are coupled over bus circuitry. CU circuitry 543 comprises CU microprocessors, CU memory, CU transceivers, and network (NET) transceivers that are coupled over bus circuitry.

In 5GNR DU circuitry 541, the antennas are coupled to 5GNR UE 401 over wireless 5GNR links. The DU transceivers in 5GNR DU circuitry 541 are coupled to the CU transceivers in CU circuitry 543 over RLC/PDCP links. The 5GNR memory stores an operating system and network applications for 5GNR Physical Layer (PHY), 5GNR Media Access Control (MAC), and 5GNR Radio Link Control (RLC). In LTE DU circuitry 542, the antennas are coupled to 5GNR UE 401 over wireless LTE links. The DU transceivers in LTE DU circuitry 542 are coupled to the CU transceivers in CU circuitry 543 over LTE Common Public Radio Interface (CPRI) links. In LTE DU circuitry 542, the LTE memory stores an operating system and network application for CPRI.

The network transceivers in CU circuitry 543 are coupled to MME 420 over S1-MME links. The network transceivers in CU circuitry 543 are coupled to S-GW 421 over S1-U links. The network transceivers in CU circuitry 543 are coupled to neighbor access nodes 411-414 over X2 links. In CU circuitry 543, the CU memory stores an operating system, virtual layer (VL) components, and network applications. The virtual layer components comprise hypervisor modules, virtual switches, virtual machines, and/or the like. The network applications comprise LTE PHY, LTE MAC, LTE RLC, LTE Packet Data Convergence Protocol (PDCP), LTE Radio Resource Control (RRC), and 5GNR PDCP. In this example, 5GNR DU circuitry 541 hosts the network applications for 5GNR PHY, 5GNR MAC, and 5GNR RLC, while CU circuitry 543 hosts the network applications for 5GNR PDCP, LTE PHY, LTE MAC, LTE RLC, LTE PDCP, and LTE RRC. In other examples, circuitry 541-543 may use other DU/CU network application splits.

In LTE DU circuitry 542, the antennas receive wireless signals from 5GNR UE 401 that transport LTE data and signaling. In LTE DU circuitry 542, the antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. In LTE DU circuitry 542, the LTE DSP recovers UL LTE symbols from the UL digital LTE signals. The LTE DSP executes the LTE CPRI application to format the UL LTE symbols for transmission. The DU transceivers transfer the UL LTE symbols to the CU transceivers in CU circuitry 543 over the CPRI links.

In CU circuitry 543, the CU microprocessors execute the LTE PHY, MAC, RLC, PDCP, and RRC to recover UL RRC data and RRC signaling from the UL LTE symbols. The LTE RRC in CU circuitry 543 receives measurement reports in the RRC signaling from the LTE RRC in 5GNR UE 401 that indicate the received signal strength at UE 401 for 5GNR access nodes 410-414. The LTE RRC processes UL RRC signaling and DL S1-MME signaling to generate UL S1-MME signaling and DL RRC signaling. For UE 401, the UL S1-MME signaling indicates, UE ID, PLMN ID, multicast signaling, and handover signaling. The network transceivers transfer the UL S1-MME signaling to MME 420 over the S1-MME links. The network transceivers transfer the UL S1-U data to LTE S-GW 421 over the S1-U links.

In CU circuitry 543, the network transceivers receive DL S1-MME signaling from MME 420 over the S1-MME links. The DL S1-MME signaling includes QCI N instructions for UE 401. The network transceivers receive DL S1-U data from S-GW 422 over the S1-U links. The CU microprocessors execute the LTE PHY, MAC, RLC, PDCP, and RRC to generate DL RRC data and RRC signaling. The LTE RRC processes UL RRC signaling and DL S1-MME signaling to generate UL S1-MME signaling and DL RRC signaling. The LTE PDCP, RLC, MAC, and PHY process DL RRC signaling and RRC data to generate DL LTE symbols. The CU transceivers transfer the DL LTE symbols to LTE DU circuitry 542 over the CPRI links.

In CU circuitry 543, the CU microprocessors execute the 5GNR PDCP to process DL S1-U data from S-GW 421 to generate DL 5GNR PDUs. The 5GNR PDCP transfers the DL 5GNR PDUs to the 5GNR RLC in 5GNR DU circuitry 541 over the CU/DU transceivers. In 5GNR DU circuitry 541, the 5GNR CPU executes the 5GNR RLC, MAC, and PHY to process the DL PDUs to generate DL 5GNR symbols. The 5GNR MAC schedules the QCI N bearer and transfers scheduling instructions to the 5GNR MAC in 5GNR UE 401. The 5GNR DSP processes the DL 5GNR symbols to generate corresponding digital DL signals for the 5GNR A/D. In LTE DU circuitry 542, the LTE DSP processes the DL LTE symbols to generate corresponding digital DL signals for the LTE A/D.

In DU circuitry 541-542, the A/Ds convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless LTE and 5GNR signals that transport the DL 5GNR data and DL LTE data/signaling to 5GNR UE 401.

The LTE RRC in UE 401 transfers signaling to the LTE RRC in CU circuitry 543 that indicates: UE ID, PLMN ID, and received signal strength at UE 401 for 5GNR access nodes 410-414. The LTE RRC in CU circuitry 543 transfers the UE ID, PLMN ID, and measurement data to MME 420 over an S1-MME link. The LTE RRC in CU circuitry 543 receives instructions to create a QCI N bearer for 5GNR UE 401 from MME 420 over the S1-MME link. The LTE RRC transfers instructions to create the QCI N bearer to the 5GNR PDCP which signals the 5GNR RLC, MAC, and PHY in 5GNR DU circuitry 541. The 5GNR PDCP in CU circuitry 543 receives the user data over an S1-U link per QCI N. The 5GNR PDCP in CU circuitry 543 transfers the user data to the 5GNR RLC in 5GNR DU circuitry 541 over per QCI N. The 5GNR RLC in 5GNR DU circuitry 541 transfers the user data to 5GNR UE 401 over the 5GNR MAC and PHY.

The LTE RRC in CU circuitry 543 processes the measurement reports from 5GNR UE 401 to determine when the received signal strength at UE 401 from source 5GNR access node 410 falls to the multicast trigger level. When the received signal strength at UE 401 reaches the multicast trigger level, the LTE RRC selects neighbor 5GNR access nodes that have adequate signal power for UE 401 and transfers multicast signaling to MME 420 that indicates the selected neighbor 5GNR access nodes—nodes 411-414 in this example. MME 420 transfers multicast signaling to S-GW 421 that indicates neighbor 5GNR access nodes 411-414, and S-GW multicasts user data for 5GNR UE 401 to 5GNR access nodes 411-414.

The LTE RRC in CU circuitry 543 processes the measurement reports from 5GNR UE 401 to determine when the received signal strength at UE 401 from source 5GNR access node 410 falls to the handover trigger level. When the received signal strength at UE 401 reaches the handover trigger level, the LTE RRC selects a target 5GNR access node—node 411 in this example—based on signal strength at UE 401 and/or some other factors. The LTE RRC in CU circuitry 543 transfers handover signaling that indicates target 5GNR access node 411 to MME 420 over the S1-MME link. The LTE RRC in CU circuitry 543 transfers handover signaling to the LTE RRC in target 5GNR access node 411 over an X2 link.

If 5GNR access node 410 happens to be a target 5GNR access node that is accepting a UE handover, the LTE RRC receives handover signaling from MME 420 having an instruction to create a QCI N bearer for 5GNR UE 401. The LTE RRC in CU circuitry 543 transfers instructions for the QCI N bearer to the 5GNR PDCP which signals the 5GNR RLC, MAC and PHY in 5GNR DU circuitry 541. 5GNR UE 401 transfers RRC signaling to the LTE RRC that indicates: UE ID, PLMN ID, QCI N, and received signal strength for 5GNR access nodes 410-414. The LTE RRC transfers instructions to the LTE RRC in 5GNR UE 401 to create the QCI N bearer. The 5GNR PDCP receives S1-U data from S-GW 421 per QCI N—including multicast user data. After the handover, the 5GNR PDCP transfers the user data—including the multicast user data—to 5GNR UE 401 over the 5GNR RLC, MAC and PHY per QCI N.

In some examples, S-GW 421 does not multicast the user data, but instead, S-GW 421 transfers the user data to the LTE RRC in 5GNR gNodeB 441. The LTE RRC in 5GNR gNodeB 441 in 5GNR access node 410 multicasts the user data to 5GNR access nodes 410-414 over X2 links per QCI N and the multicast trigger. The LTE RRC stops the multicast of the user data to 5GNR access nodes 410-414 responsive to the handover trigger.

In CU circuitry 543, the 5GNR PDCP maps between the S1-U data and Protocol Data Units (PDUs). The 5GNR PDCP exchanges the 5GNR PDUs with the 5GNR RLC in 5GNR DU circuitry 541. In 5GNR DU circuitry 541, the 5GNR RLC maps between the PDUs from CU circuitry 543 and MAC logical channels. The 5GNR RLC exchanges the SDAP data with the 5GNR MAC over the MAC logical channels. The 5GNR MAC maps between the MAC logical channels and MAC transport channels. The 5GNR MAC exchanges the 5GNR SDAP data signaling with the 5GNR PHY over the MAC transport channels. The 5GNR PHY maps between the MAC transport channels and PHY transport channels. The 5GNR PHY transfers the 5GNR data to the 5GNR PHY in 5GNR UE 401 over the PHY transport channels.

In CU circuitry 543, the LTE RRC maps between S1-U data and SDUs. The LTE RRC maps between S1-MME signaling and Service data Units (SDUs). The LTE RRC exchanges the SDUs with the LTE PDCP. The LTE PDCP maps between the SDUs and PDUs. The LTE PDCP exchanges the PDUs with the LTE RLC. The LTE RLC maps between the PDUs and MAC logical channels. The LTE RLC exchanges the RRC data and RRC signaling with the LTE MAC over the MAC logical channels. The LTE MAC maps between the MAC logical channels and MAC transport channels. The LTE MAC exchanges the RRC data and RRC signaling with the LTE PHY over the MAC transport channels. The LTE PHY maps between the MAC transport channels and PHY transport channels. The LTE PHY in CU circuitry 543 exchanges the RRC data and RRC signaling with the LTE PHY in 5GNR UE 401 over the PHY transport channels.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 6:
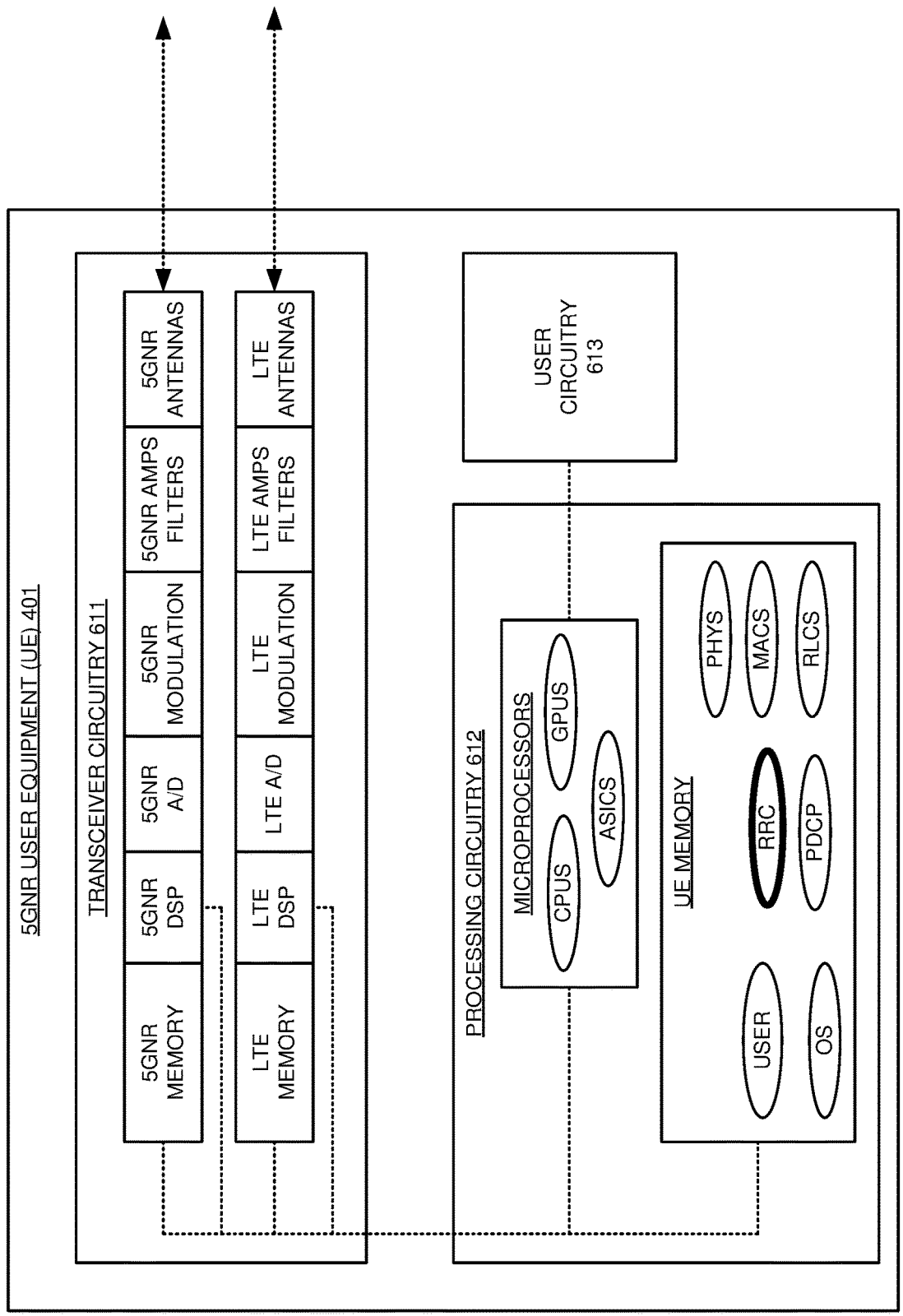
FIG. 6 illustrates the UE that receives the low-latency QoS from the 5GNR access node.

FIG. 6 illustrates 5GNR UE 401 that receives the low-latency QoS from 5GNR access node 410. 5GNR UE 401 is an example of UE 101 although UE 101 may differ. 5GNR UE 401 comprises transceiver circuitry 611, processing circuitry 612, and user circuitry 613 which are interconnected over bus circuitry. User circuitry 613 comprises graphic displays, machine controllers, sensors, cameras, transceivers, and/or some other user interface components. Transceiver circuitry 611 comprises radios for 5GNR and LTE. The radios each comprise antennas, amplifiers, filters, modulation, analog/digital interfaces, DSP, and memory. The radios may share some of these components by using time diversity, frequency separation, and the like.

Processing circuitry 612 comprises microprocessors and UE memory. The microprocessors comprise CPUs, GPUs, ASICs, and/or some other computer circuitry. The UE memory comprises volatile and non-volatile data storage like RAM, flash, and/or disk. The UE memory stores an operating system, user applications, and network applications for 5GNR and LTE. The network applications comprise LTE PHY, LTE MAC, LTE RLC, LTE PDCP, LTE RRC, 5GNR PHY, 5GNR MAC, and 5GNR RLC. The microprocessors execute the operating system, user applications, and network applications to exchange user data and network signaling with 5GNR access point 410-414.

The user applications store Uplink (UL) user data and signaling in the UE memory. The network applications process the UL user data/signaling and Downlink (DL) network signaling to generate UL network signaling. The network applications transfer the UL user data and network signaling to the memories in transceiver circuitry 611. In transceiver circuitry 611, the DSP processes the UL user data and network signaling to transfer corresponding digital UL signals to the A/D interfaces. The A/D interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless signals that transport the UL user data and network signaling to 5GNR access points 410-414.

In the transceiver circuitry 611, the antennas receive wireless signals that transport user data and network signaling from 5GNR access points 410-414. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The A/D interfaces convert the analog DL signals into digital DL signals for the DSPs. The DSPs recover DL data from the digital DL signals. The DSPs transfer the DL data to the UE memory. The microprocessors execute the network applications to process the DL data to recover the DL user data and network signaling. The microprocessors execute the network applications to store the DL user data and signaling in the UE memory. The user applications process their user data and signaling in the UE memory.

Figure 7:
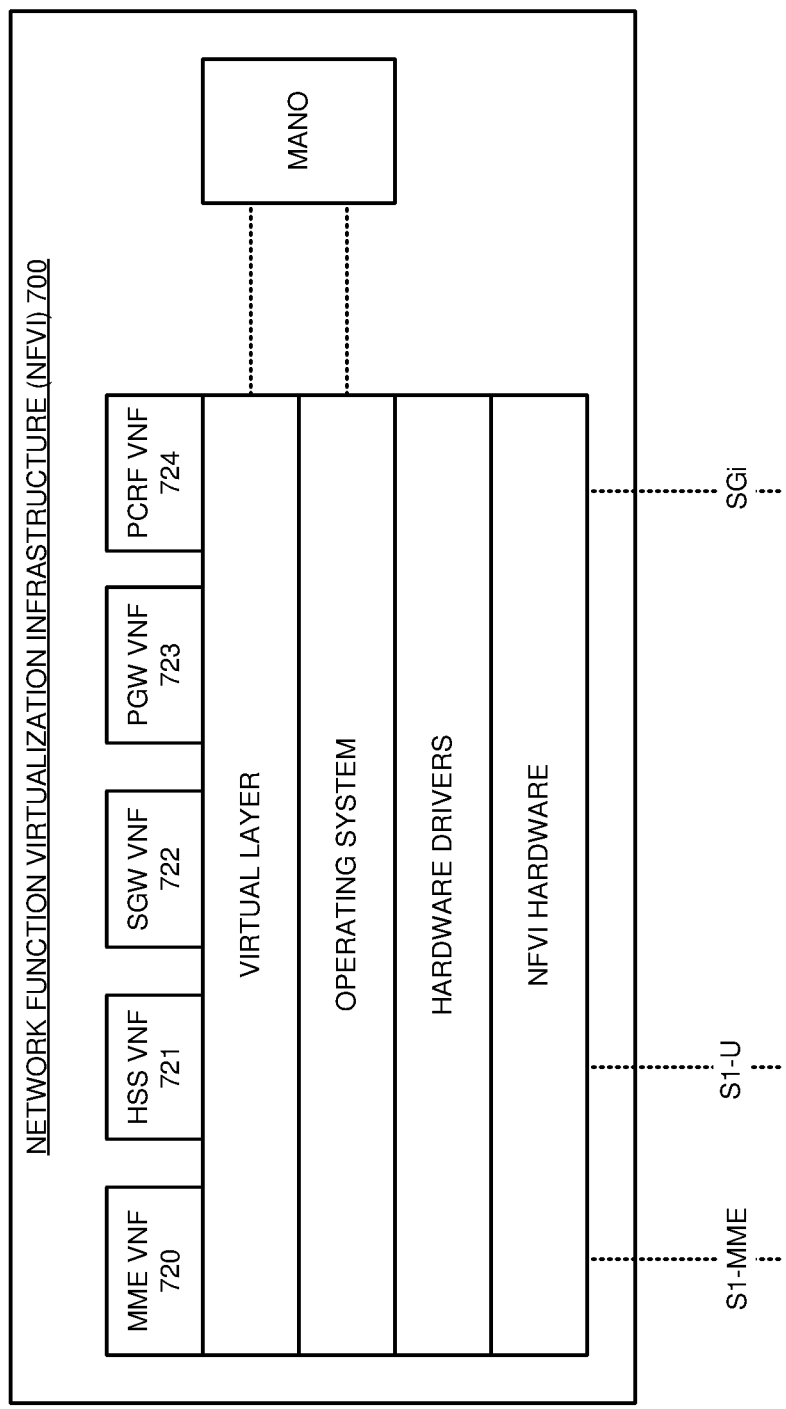
FIG. 7 illustrates a Network Function Virtualization Infrastructure (NFVI) in the 5GNR network that serves the UEs with the low-latency QoS.

FIG. 7 illustrates Network Function Virtualization Infrastructure (NFVI) 700 that serves 5GNR UE 401 with low-latency QoS. NFVI 700 comprises NFVI hardware, hardware drivers, operating system, virtual layer, Management and Orchestration (MANO), and Virtual Network Functions (VNFs) 720-724. NFVI 700 executes the hardware drivers, operating system, virtual layer, MANO, and VNFs 720-724 to serve 5GNR UE 401. MME 420 from FIG. 4 comprises MME VNF 720 and portions of the NFVI hardware, hardware drivers, operating system, and virtual layer. HSS 421 from FIG. 4 comprises HSS VNF 721 and portions of the NFVI hardware, hardware drivers, operating system, and virtual layer. S-GW 422 from FIG. 4 comprises SGW VNF 722 and portions of the NFVI hardware, hardware drivers, operating system, and virtual layer. P-GW 423 from FIG. 4 comprises PGW VNF 723 and portions of the NFVI hardware, hardware drivers, operating system, and virtual layer. PCRF 424 from FIG. 4 comprises PCRF VNF 724 and portions of the NFVI hardware, hardware drivers, operating system, and virtual layer.

MME VNF 720 receives the UE ID and PLMN ID for 5GNR UE 401 from 5GNR access point 410. MME VNF 720 transfers the UE ID and PLMN ID for UE 401 to HSS VNF 722. HSS 722 translates the UE ID and the PLMN ID for UE 401 into an Access Point Name (APN) for P-GW VNF 723. HSS VNF 722 returns the APN to MME VNF 720. MME VNF 720 transfers the UE ID, PLMN ID, and APN for UE 401 to PCRF VNF 724 over S-GW VNF 721 and PGW VNF 723. PCRF VNF 724 translates the PLMN ID and possibly the UE ID into a QoS Class Identifier (QCI) "N" for 5GNR UE 401. QCI N is representative and has metrics and rules for a low-latency wireless data service. PCRF VNF 724 transfers the QCI N to MME VNF 720 over SGW VNF 722 and PGW VNF 723. MME VNF 720 transfers the UE ID, PLMN ID, APN, and QCI N for 5GNR UE 401 to LTE eNodeB 443 in source 5GNR access point 410. MME VNF 720 transfers the UE ID, PLMN ID, APN, and QCI N for 5GNR UE 401 to SGW VNF 722 which forwards the information to PGW VNF 723. P-GW VNF 723 receives user data for 5GNR UE 401 over an SGi link and transfers the user data to SGW VNF 722 over an S5 link. S-GW VNF 722 transfers the user data to 5GNR gNodeB 441 in source 5GNR access point 410 over an S1-U link.

MME VNF 720 receives multicast signaling for UE 401 from 5GNR access point 410 and transfers the multicast signaling to S-GW VNF 721. In response to the multicast signaling, S-GW VNF 721 multicasts the user data for 5GNR UE 401 to 5GNR access nodes 410-411 over S1-U links. MME VNF 720 receives handover signaling for 5GNR UE 401 from LTE eNodeB 443 in source 5GNR access point 410 and transfers the handover signaling to S-GW VNF 721. In response to the handover signaling, S-GW VNF 721 terminates the multicast to 5GNR access nodes 410-414 and transfers the user data to 5GNR gNodeB 442 in target 5GNR access node 411 over an S1-U link per QCI N.

Figure 8:
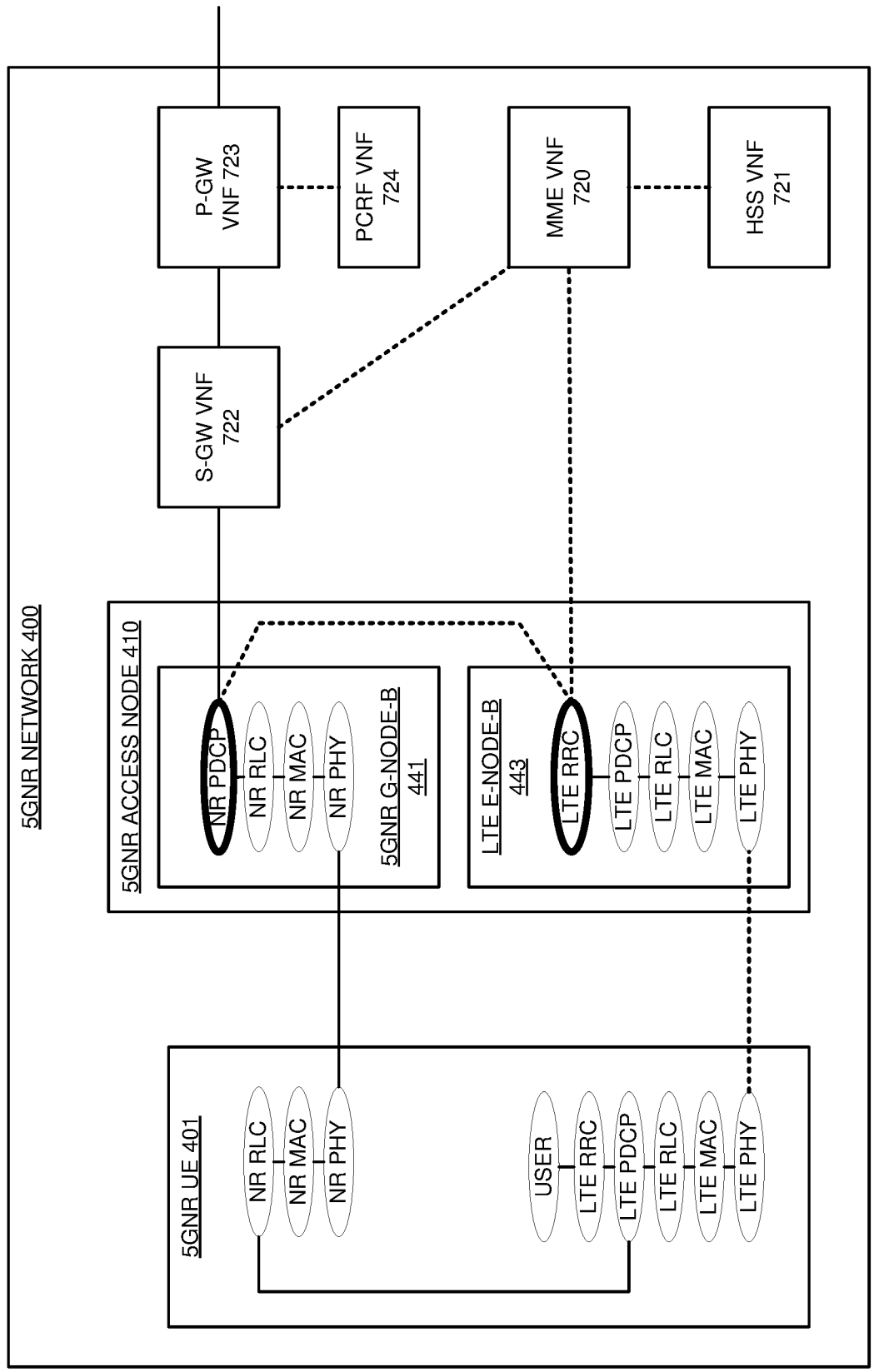
FIG. 8 illustrates the operation of the 5GNR network having the LTE eNodeBs to serve the UEs with the low-latency QoS.

FIG. 8 illustrates the operation of 5GNR network 400 having LTE eNodeB 443 to serve 5GNR UE 401 with low-latency QoS. The LTE RRC in 5GNR UE 401 exchanges attachment signaling with the LTE RRC in LTE eNodeB 443 over the LTE PDCP, RLC, MAC, and PHY layers. The LTE RRC in LTE eNodeB 443 transfers attachment signaling to MME VNF 720. MME VNF 720 transfers attachment signaling to HSS VNF 722. HSS VNF 722 translates the attachment signaling into an APN for P-GW VNF 723 and returns the APN to MME VNF 720. MME VNF 720 transfers the UE ID, PLMN ID, and APN for 5GNR UE 401 to PCRF VNF 724 over S-GW VNF 721 and P-GW VNF 723. PCRF VNF 724 translates the PLMN ID and possibly UE ID into QCI N for 5GNR UE 401. QCI N has metrics and rules for a low-latency wireless data service. PCRF VNF 724 transfers the QCI N to MME VNF 720 over S-GW VNF 721 and P-GW VNF 723.

MME VNF 720 transfers instructions to create a QCI N bearer for 5GNR UE 401 to the LTE RRC in LTE eNodeB 443. The LTE RRC in LTE eNodeB 443 transfers instructions to create the QCI N bearer to the LTE RRC in 5GNR UE 401 over the LTE PDCP, RLC, MAC, and PHY layers. The LTE RRC in LTE eNodeB 443 transfers instructions to create the QCI N bearer to the 5GNR PDCP which signals the 5GNR RLC, MAC, and PHY in 5GNR gNodeB 441. MME VNF 720 transfers instructions to create a QCI N bearer for 5GNR UE 401 to S-GW VNF 722, and S-GW VNF 722 transfers the QCI N instructions to P-GW VNF 723.

P-GW VNF 723 receives user data for 5GNR UE 401 and transfers the user data to S-GW VNF 722 per the QCI N. S-GW VNF 722 transfers the user data to the 5GNR PDCP in 5GNR gNodeB 441 per QCI N. The 5GNR PDCP in 5GNR gNodeB 441 transfers the user data to the LTE PDCP in 5GNR UE 101 over the 5GNR RLC, MAC, and PHY layers per QCI N. The LTE PDCP in 5GNR UE 101 transfers the user data to the user application over the LTE RRC.

The LTE RRC in LTE eNodeB 443 receives and processes measurement reports from the LTE RRC in 5GNR UE 401 that indicates received signal strength at UE 401 for source 5GNR access node 410 and for neighbor 5GNR access nodes 411-414. In response to the QCI N for 5GNR UE 401, the LTE RRC in LTE eNodeB 443 identifies when the received signal strength at 5GNR UE 401 falls to a multicast trigger level. When the received signal strength at 5GNR UE 401 reaches the multicast trigger level, the LTE RRC in eNodeB 443 transfers multicast signaling to MME VNF 720 that indicates selected neighbor access nodes 411-414. MME VNF 720 transfers multicast signaling to S-GW VNF 721 that indicates selected neighbor access nodes 411-414. In response to the multicast signaling, S-GW VNF 721 multicasts the user data for 5GNR UE 401 to the 5GNR PDCPs in 5GNR access nodes 410-411. 5GNR gNodeB 441 continues to wirelessly transfer the user data to 5GNR UE 401 per QCI N.

The LTE RRC in LTE eNodeB 443 processes the measurement reports from the LTE RRC in 5GNR UE 401 to determine when the received signal strength at 5GNR UE 401 from source 5GNR access node 410 reaches a handover trigger level. When the received signal strength at UE 401 reaches the handover trigger level, the LTE RRC in LTE eNodeB 443 selects a target one of neighbor 5GNR access nodes 411-414 based on their signal strength at 5GNR UE 401. In this example, the LTE RRC in LTE eNodeB 443 selects target 5GNR access node 411, but 5GNR access nodes 412-414 could be selected in other examples. The LTE RRC in LTE eNodeB 443 transfers handover signaling that indicates target 5GNR access node 411 to MME VNF 720. The LTE RRC in LTE eNodeB 443 transfers handover signaling to the LTE RRC in LTE eNodeB 444 over an X2 link.

MME VNF 720 transfers handover signaling to S-GW VNF 721 over the S11 link to create a QCI N bearer for 5GNR UE 401. S-GW VNF 721 terminates the multicast to 5GNR access nodes 410-414 responsive to the handover signaling. MME VNF 720 transfers handover signaling to the LTE RRC in LTE eNodeB 444 to create a QCI N bearer for 5GNR UE 401. The LTE RRC in LTE eNodeB 444 transfers instructions for the QCI N bearer to the 5GNR PDCP which signals the 5GNR RLC, MAC, and PHY in 5GNR gNodeB 442. 5GNR UE 401 transfers RRC signaling to LTE eNodeB 444 that indicates: UE ID, PLMN ID, QCI N, and received signal strength for 5GNR access nodes 410-414. The LTE RRC in LTE eNodeB 444 transfers QCI N instructions to 5GNR UE 401. P-GW VNF 723 receives user data for 5GNR UE 401 and transfers the user data to S-GW VNF 721 per QCI N. S-GW VNF 721 transfers the user data to 5GNR gNodeB 442 per QCI N. 5GNR gNodeB 442 wirelessly transfers the user data to 5GNR UE 401 per QCI N.

In some examples, S-GW VNF 722 does not multicast the user data, but S-GW VNF 722 transfers the user data to the LTE RRC in LTE eNodeB 443. The LTE RRC in LTE eNodeB 443 multicasts the user data to the LTE RRCs in 5GNR access nodes 411-414 over X2 links responsive to the multicast trigger. The LTE RRC in LTE eNodeB 443 stops the multicast of the user data to 5GNR access nodes 411-414 in response to the handover trigger.

Figure 9:
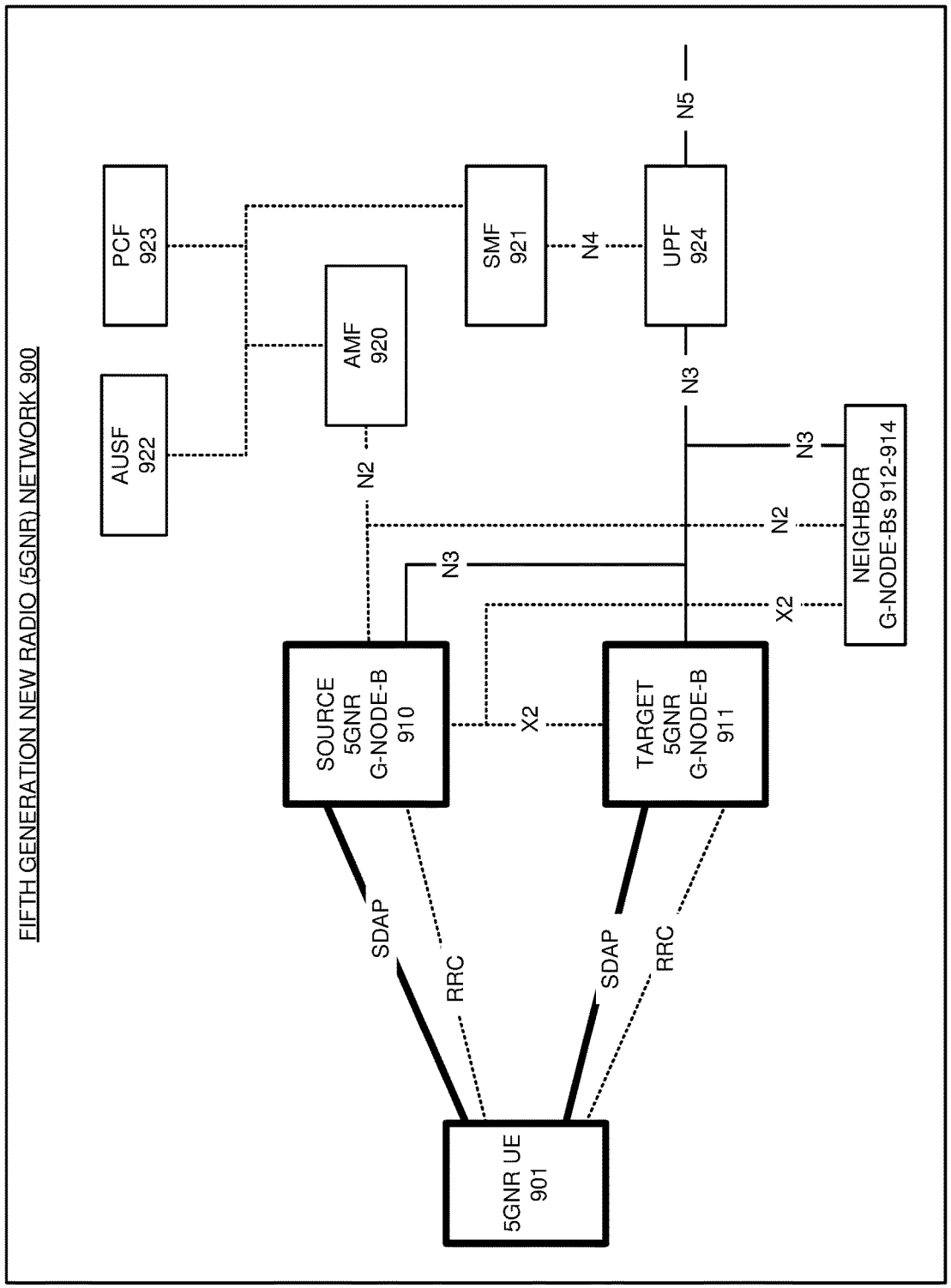
FIG. 9 illustrates a 5GNR network to serve UEs with a low-latency QoS.

FIG. 9 illustrates 5GNR network 900 to serve 5GNR UE 901 with a low-latency QoS. 5GNR network 900 is an example of 5GNR network 100, although network 100 may differ. 5GNR network 900 comprises 5GNR UE 901, 5GNR gNodeBs 910-914, Access and Mobility Management Function (AMF) 920, Session Management Function (SMF) 921, Authentication Server Function (AUSF) 922, Policy Control Function (923), and User Plane Function (UPF) 924.

Initially, 5GNR UE 901 is coupled to source 5GNR gNodeB 910 with a 5GNR RRC signaling link. 5GNR UE 901 transfers RRC signaling to 5GNR gNodeB 910 that indicates: UE ID, PLMN ID, and received signal strength for target 5GNR gNodeB 911 and neighbor gNodeBs 912-914. 5GNR gNodeB 910 transfers the UE ID and PLMN ID to AMF 920 over an N2 link. AMF 920 transfers the UE ID and PLMN ID to AUSF 922 and PCF 923. AUSF 922 translates the UE ID and the PLMN ID into a network ID for UPF 924. PCF 923 translates the UE ID and the PLMN ID into a low-latency QoS for UE 901. AMF 920 transfers a request to create a low-latency bearer for 5GNR UE 901 to SMF 921. SMF 921 instructs UPF 924 over the N4 link to handle the low-latency bearer. AMF 920 transfers instructions to create the low-latency bearer for 5GNR UE 901 to source 5GNR gNodeB 910 over an N2 link. Source 5GNR gNodeB 910 transfers instructions for the low-latency bearer to 5GNR UE 901 over the RRC signaling link. UPF 924 receives user data for 5GNR UE 901 over an N5 link. UPF 924 transfers the user data to source 5GNR gNodeB 910 over an N3 link per the low-latency QoS. Source 5GNR gNodeB 910 wirelessly transfers the user data to 5GNR UE 901 over the 5GNR SDAP data link per the low-latency QoS.

Source 5GNR gNodeB 910 receives and processes reports from 5GNR UE 901 that indicate received signal strength at UE 901 for 5GNR access nodes 910-914. In response to the low-latency QoS for 5GNR UE 901, source 5GNR gNodeB 910 identifies when the received signal strength at 5GNR UE 901 from source gNodeB 910 falls to a multicast trigger level. When the received signal strength at UE 901 reaches the multicast trigger level, source 5GNR gNodeB 910 transfers multicast signaling to AMF 920 over the N2 link that indicates target/neighbor 5GNR access nodes 911-914 that were indicated in the measurement reports from 5GNR UE 901 as having adequate signal power to serve UE 901. AMF 920 transfers multicast signaling that indicates selected target/neighbor 5GNR access nodes 911-914 to SMF 921 which forwards the multicast signaling to UPF 924. In response to the multicast signaling, UPF 924 multicasts the user data for UE 901 to the neighbor 5GNR access nodes over N3 links. Source 5GNR gNodeB 910 continues to wirelessly transfer the user data to 5GNR UE 901 over the 5GNR SDAP link per the low-latency QoS.

Source 5GNR gNodeB 910 processes the measurement reports from 5GNR UE 901 to determine when the received signal strength at 5GNR UE 901 from source 5GNR gNodeB 910 reaches a handover trigger level. When the received signal strength at UE 901 reaches the handover trigger level, source 5GNR gNodeB 910 selects target 5GNR gNodeB 911 from the neighbor gNodeBs based on its signal strength at 5GNR UE 901. Source 5GNR gNodeB 910 transfers handover signaling that indicates target 5GNR gNodeB 911 to AMF 920 over the N2 link. Source 5GNR gNodeB 910 transfers handover signaling to target 5GNR gNodeB 911 over an X2 link. AMF 920 transfers handover signaling to SMF 921 which forwards the handover signaling to UPF 924 to create the low-latency QoS bearer for UE 901. AMF 920 transfers handover signaling to target 5GNR gNodeB 911 over an N2 link to create a low-latency QoS bearer for UE 901. UPF 921 terminates the multicast to 5GNR gNodeBs 410-414 responsive to the handover signaling.

5GNR UE 901 transfers 5GNR RRC signaling to target 5GNR gNodeB 911 that indicates: UE ID, PLMN ID, QoS, and received signal strength for 5GNR gNodeBs 910-914. Target 5GNR gNodeB 911 transfers instructions to 5GNR UE 901 over the 5GNR RRC link to create the low-latency QoS bearer. UPF 924 receives user data for 5GNR UE 901 and transfers the user data to target 5GNR gNodeB 911 over a N3 per the low-latency QoS. Target 5GNR gNodeB 911 wirelessly transfers the user data to 5GNR UE 901 over the 5GNR SDAP link per the low-latency QoS.

Figure 10:
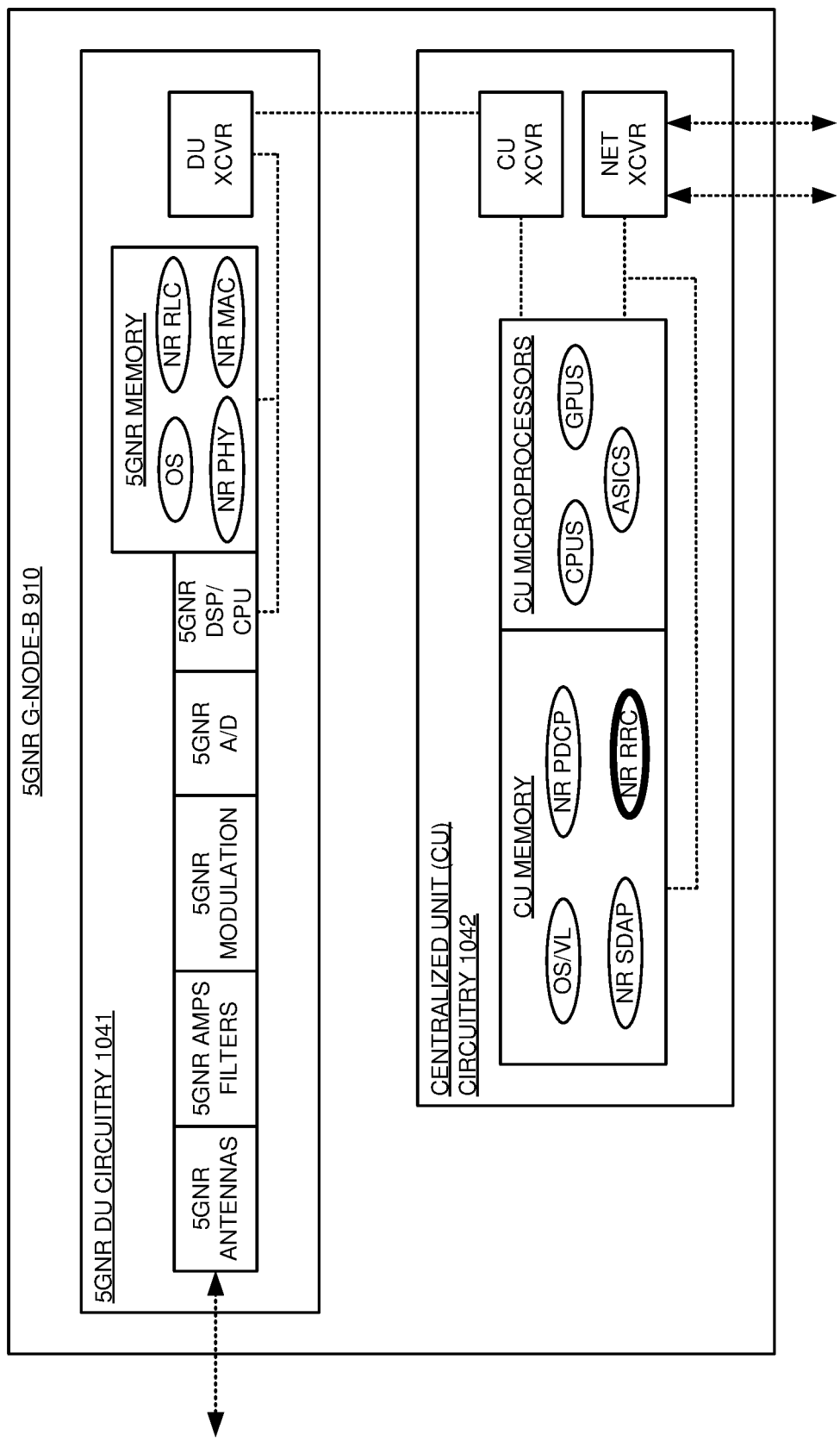
FIG. 10 illustrates a 5GNR access node to serve the UEs with the low-latency QoS.

FIG. 10 illustrates 5GNR gNodeB 910 to serve UE 901 with the low-latency QoS. 5GNR access node 910 comprises examples of wireless access nodes 110-114, 410-414, and 911-914, although these access nodes may differ. 5GNR access node 910 comprises 5GNR Distributed Unit (DU) circuitry 1041, and Centralized Unit (CU) circuitry 1042. 5GNR DU circuitry 1041-1042 each comprise antennas, amplifiers, filters, modulation, Analog-to-Digital interfaces, DSP, CPU, memory, and DU transceivers that are coupled over bus circuitry. CU circuitry 1042 comprises CU microprocessors, CU memory, CU transceivers, and network transceivers that are coupled over bus circuitry.

In 5GNR DU circuitry 1041, the antennas are coupled to 5GNR UE 901 over wireless 5GNR links. The DU transceivers in 5GNR DU circuitry 1041 are coupled to the CU transceivers in CU circuitry 1042 over RLC/PDCP links. The 5GNR memory stores an operating system and network applications for 5GNR PHY, MAC, and RLC. The network transceivers in CU circuitry 1042 are coupled to AMF 920 over N2 links. The network transceivers in CU circuitry 1042 are coupled to UPF 924 over N3 links. The network transceivers in CU circuitry 1042 are coupled to 5GNR gNodeBs 911-914 over X2 links. In CU circuitry 1042, the CU memory stores an operating system, virtual layer components, and network applications. The virtual layer components comprise hypervisor modules, virtual switches, virtual machines, and/or the like. In this example, 5GNR DU circuitry 1041 hosts the network applications for 5GNR PHY, MAC, and RLC, while CU circuitry 1042 hosts the network applications for 5GNR PDCP, RRC, and SDAP. In other examples, circuitry 1041-1042 may use other DU/CU network application splits.

In 5GNR DU circuitry 1041, the antennas receive wireless signals from 5GNR UE 901 that transport 5GNR data and signaling. In 5GNR DU circuitry 1042, the antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. In 5GNR DU circuitry 1041, the 5GNR DSP recovers UL 5GNR symbols from the UL digital signals. The 5GNR DSP executes the PHY, MAC, and RLC to recover 5GNR PDUs from the UL digital signals. The DU transceivers transfer the UL 5GNR PDUs to the CU transceivers in CU circuitry 1042 over the RLC/PDCP links.

In CU circuitry 1042, the CU microprocessors execute the 5GNR PDCP, RRC, and SDAP to recover UL SDAP data and UL RRC signaling from the UL 5GNR PDUs. The 5GNR RRC in CU circuitry 1042 receives measurement reports in RRC signaling from the 5GNR RRC in 5GNR UE 901 that indicate the received signal strength at UE 401 for 5GNR gNodeBs 910-914. The 5GNR RRC processes UL RRC signaling and DL N2 signaling to generate UL N2 signaling and DL RRC signaling. For 5GNR UE 401, the UL N2 signaling indicates UE ID, PLMN ID, multicast triggers, and handover triggers. The network transceivers transfer the UL N2 signaling to AMF 920 over the N2 links. The network transceivers transfer the UL N3 data to UPF 924 over the N3 links.

In CU circuitry 1042, the network transceivers receive DL N2 signaling from AMF 920 over the N2 links. The DL N2 signaling includes low-latency QoS instructions for UE 401. The network transceivers receive DL N3 data from UPF 924 over the N3 links. The CU microprocessors execute the 5GNR PDCP to process DL N3 data from UPF 924 to generate DL 5GNR PDUs. The 5GNR PDCP transfers the DL 5GNR PDUs to the 5GNR RLC in 5GNR DU circuitry 1041 over the CU/DU transceivers. In 5GNR DU circuitry 1041, the 5GNR CPU executes the 5GNR RLC, MAC, and PHY to process the DL PDUs to generate DL 5GNR symbols. The 5GNR MAC schedules the low-latency QoS bearers and transfers the schedule to the 5GNR MAC in 5GNR UE 901. The 5GNR DSP processes the DL 5GNR symbols to generate corresponding digital DL signals for the 5GNR A/D.

In DU circuitry 1041-1042, the A/Ds convert the digital DL signals into analog DL signals for modulation. Modulation up-converts the DL signals to their carrier frequencies. The amplifiers boost the modulated DL signals for the filters which attenuate unwanted out-of-band energy. The filters transfer the DL signals through duplexers to the antennas. The electrical DL signals drive the antennas to emit corresponding wireless 5GNR signals that transport the DL 5GNR SDAP data and RRC signaling to 5GNR UE 901.

The 5GNR RRC UE 901 transfers signaling to the 5GNR RRC in CU circuitry 543 that indicates: UE ID, PLMN ID, and received signal strength at UE 901 for 5GNR gNodeBs 910-914. The 5GNR RRC in CU circuitry 1042 transfers the UE ID, PLMN ID, and measurement data to AMF 920 over an N2 link. The 5GNR RRC in CU circuitry 1042 receives instructions to create a low-latency QoS bearer for 5GNR UE 901 from AMF 920 over the N2 link. The 5GNR RRC transfers instructions to create the low-latency QoS bearer to the 5GNR SDAP and PDCP in CU circuitry 1042, and the PDCP signals the 5GNR RLC, MAC, and PHY in 5GNR DU circuitry 1041. The 5GNR SDAP in CU circuitry 1042 receives the user data over an N3 link per the low-latency QoS. The 5GNR SDAP in CU circuitry 1042 transfers the user data to the PDCP which forwards the user data to the 5GNR RLC in 5GNR DU circuitry 541 per the low-latency QoS. The 5GNR RLC in 5GNR DU circuitry 1041 transfers the user data to 5GNR UE 901 over the 5GNR MAC and PHY.

The 5GNR RRC in CU circuitry 1042 processes the measurement reports from 5GNR UE 901 to determine when the received signal strength at UE 001 from source 5GNR gNodeB 910 falls to the multicast trigger level. When the received signal strength at UE 901 reaches the multicast trigger level, the 5GNR RRC selects the neighbor access nodes—nodes 911-914 in this example—that have adequate signal power and transfers multicast signaling to AMF 920 that indicates neighbor 5GNR gNodeBs 911-914. AMF 920 transfers multicast signaling to SMF 921 which signals UPF 924. UPF 924 multicasts user data for 5GNR UE 901 to 5GNR gNodeBs 910-914.

The 5GNR RRC in CU circuitry 1042 processes the measurement reports from 5GNR UE 901 to determine when the received signal strength at 5GNR UE 901 from source 5GNR gNodeB 910 falls to the handover trigger level. When the received signal strength at UE 901 reaches the handover trigger level, the 5GNR RRC selects one of the 5GNR neighbor gNodeBs—gNodeB 911 in this example—based on signal strength at 5GNR UE 901 and/or some other factors. The 5GNR RRC in CU circuitry 1042 transfers handover signaling that indicates target 5GNR gNodeB 911 to AMF 920 over the N2 link. The 5GNR RRC in CU circuitry 1042 transfers handover signaling to the 5GNR RRC in target 5GNR access node 911 over an X2 link.

When 5GNR access node 910 happens to be a target 5GNR access node that is accepting a UE handover, the 5GNR RRC receives handover signaling from AMF 920 having an instruction to create a low-latency QoS bearer for 5GNR UE 901. The 5GNR RRC in CU circuitry 1042 transfers instructions for the low-latency QoS bearer to the 5GNR PDCP which signals the RLC, MAC, and PHY in 5GNR DU circuitry 1041. 5GNR UE 901 transfers 5GNR RRC signaling to the 5GNR RRC in target 5GNR gNodeB 910 that indicates: UE ID, PLMN ID, low-latency QoS, and received signal strength for 5GNR gNodeBs 910-914. The 5GNR RRC in 5GNR gNodeB 910 transfers instructions to the 5GNR RRC in UE 901 to create the low-latency QoS bearer. The 5GNR SDAP in gNodeB 910 receives data from UPF 924 per the low-latency QoS—including multicast user data. After the handover, the 5GNR SDAP transfers the user data—including the multicast user data—to 5GNR UE 901 over the 5GNR PDCP, RLC, MAC and PHY per the low latency QoS.

In some examples, UPF 924 does not multicast the user data, but instead, UPF 924 transfers the user data to the 5GNR SDAP in 5GNR gNodeB 941 over an N3 link. The 5GNR SDAP in source gNodeB 910 multicasts the user data to 5GNR gNodeBs 911-914 over X2 links per the low-latency QoS and the multicast trigger for 5GNR UE 901. The 5GNR SDAP stops the multicast of the user data to 5GNR gNodeBs 910-914 over the X2 links responsive to the handover trigger received by the 5GNR RRC.

In 5GNR CU circuitry 1042, the 5GNR SDAP maps between the N3 data and SDUs. In CU circuitry 1042, the 5GNR RRC maps between N2 signaling and SDUs. The 5GNR SDAP and the 5GNR RRC exchange the SDUs with the 5GNR PDCP. The 5GNR PDCP in 5GNR DU circuitry 1042 maps the 5GNR SDUs to 5GNR PDUs. The 5GNR DCP exchanges the 5GNR PDUs with the 5GNR RLC in 5GNR DU circuitry 1041. In 5GNR DU circuitry 1041, the 5GNR RLC maps between the PDUs from CU circuitry 1042 and MAC logical channels. The 5GNR RLC exchanges the SDAP data and RRC signaling with the 5GNR MAC over the MAC logical channels. The 5GNR MAC maps between the MAC logical channels and MAC transport channels. The 5GNR MAC exchanges the 5GNR SDAP data and RRC signaling with the 5GNR PHY over the MAC transport channels. The 5GNR PHY maps between the MAC transport channels and PHY transport channels. The 5GNR PHY transfers the SDAP data and RRC signaling to the 5GNR PHY in 5GNR UE 901 over the PHY transport channels.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

Figure 11:
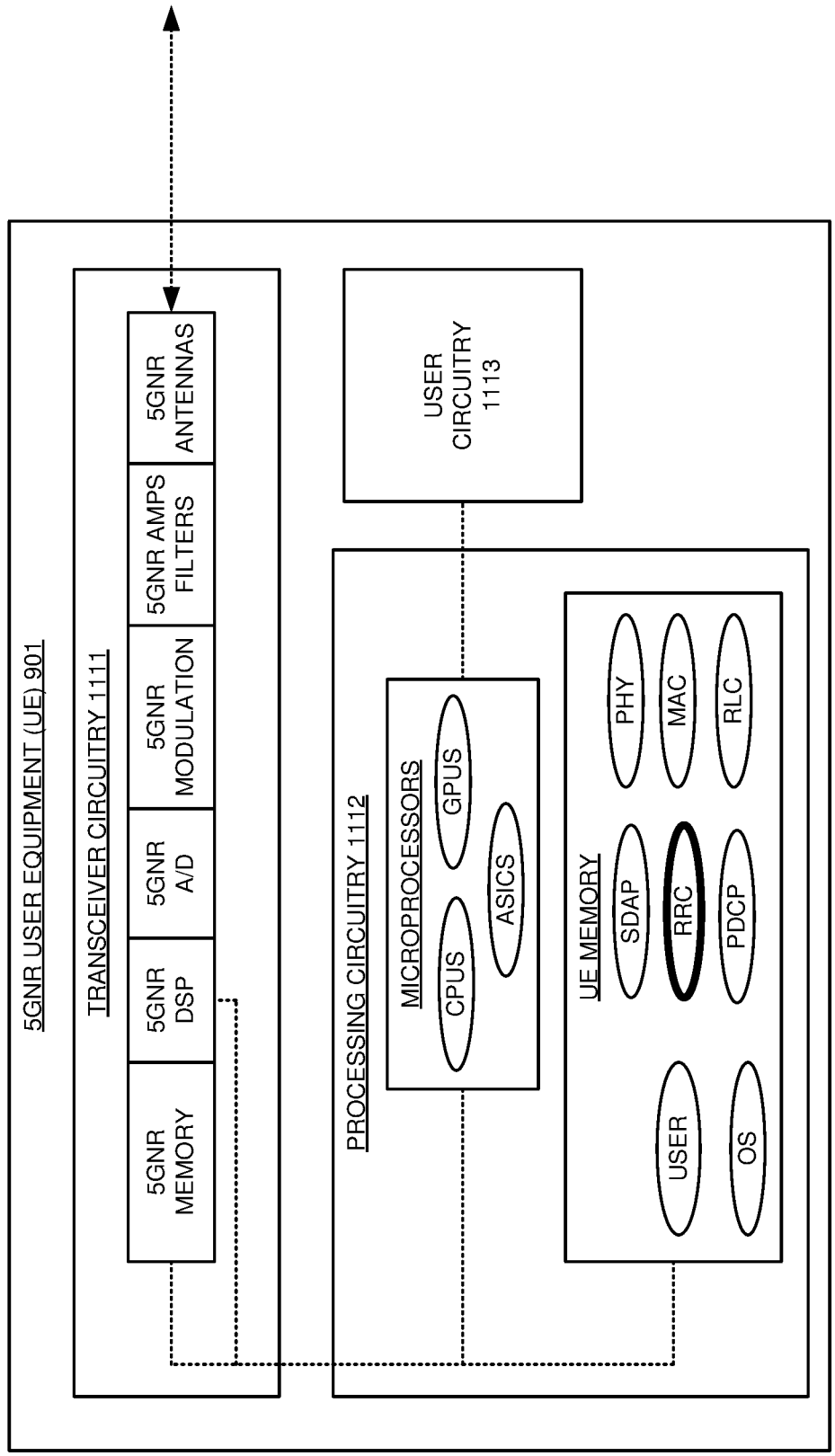
FIG. 11 illustrates the UE that receives the low-latency QoS from the 5GNR access node.

FIG. 11 illustrates 5GNR UE 901 that receives the low-latency QoS from 5GNR gNodeB 910. 5GNR UE 901 is an example of UEs 101 and 401 although UEs 101 and 401 may differ. 5GNR UE 901 comprises transceiver circuitry 1111, processing circuitry 1112, and user circuitry 1113 which are interconnected over bus circuitry. User circuitry 1113 comprises graphic displays, machine controllers, sensors, cameras, transceivers, and/or some other user interface components. Transceiver circuitry 1111 comprises radios for 5GNR. The radios each comprise antennas, amplifiers, filters, modulation, analog/digital interfaces, DSP, and memory. The radios may share some of these components by using time diversity, frequency separation, and the like.

Processing circuitry 1112 comprises microprocessors and UE memory. The microprocessors comprise CPUs, GPUs, ASICs, and/or some other computer circuitry. The UE memory comprises volatile and non-volatile data storage like RAM, flash, and/or disk. The UE memory stores an operating system, user applications, and network applications for 5GNR. The network applications comprise 5GNR PHY, MAC, RLC, PDCP, RRC, and SDAP. The microprocessors execute the operating system, user applications, and network applications to exchange user data and network signaling with 5GNR gNodeBs 910-914.

The user applications store UL user data and signaling in the UE memory. The network applications process the UL user data/signaling and DL network signaling to generate UL network signaling. The network applications transfer the UL user data and network signaling to the memories in transceiver circuitry 1111. In transceiver circuitry 1111, the DSP processes the UL user data and network signaling to transfer corresponding digital UL signals to the A/D interfaces. The A/D interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless signals that transport the UL user data and network signaling to 5GNR gNodeBs 910-914.

In the transceiver circuitry 1111, the antennas receive wireless signals that transport user data and network signaling from 5GNR gNodeBs 910-914. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The A/D interfaces convert the analog DL signals into digital DL signals for the DSPs. The DSPs recover DL data from the digital DL signals. The DSPs transfer the DL data to the UE memory. The microprocessors execute the network applications to process the DL data to recover the DL user data and network signaling. The microprocessors execute the network applications to store the DL user data and signaling in the UE memory. The user applications process their user data and signaling in the UE memory.

Figure 12:
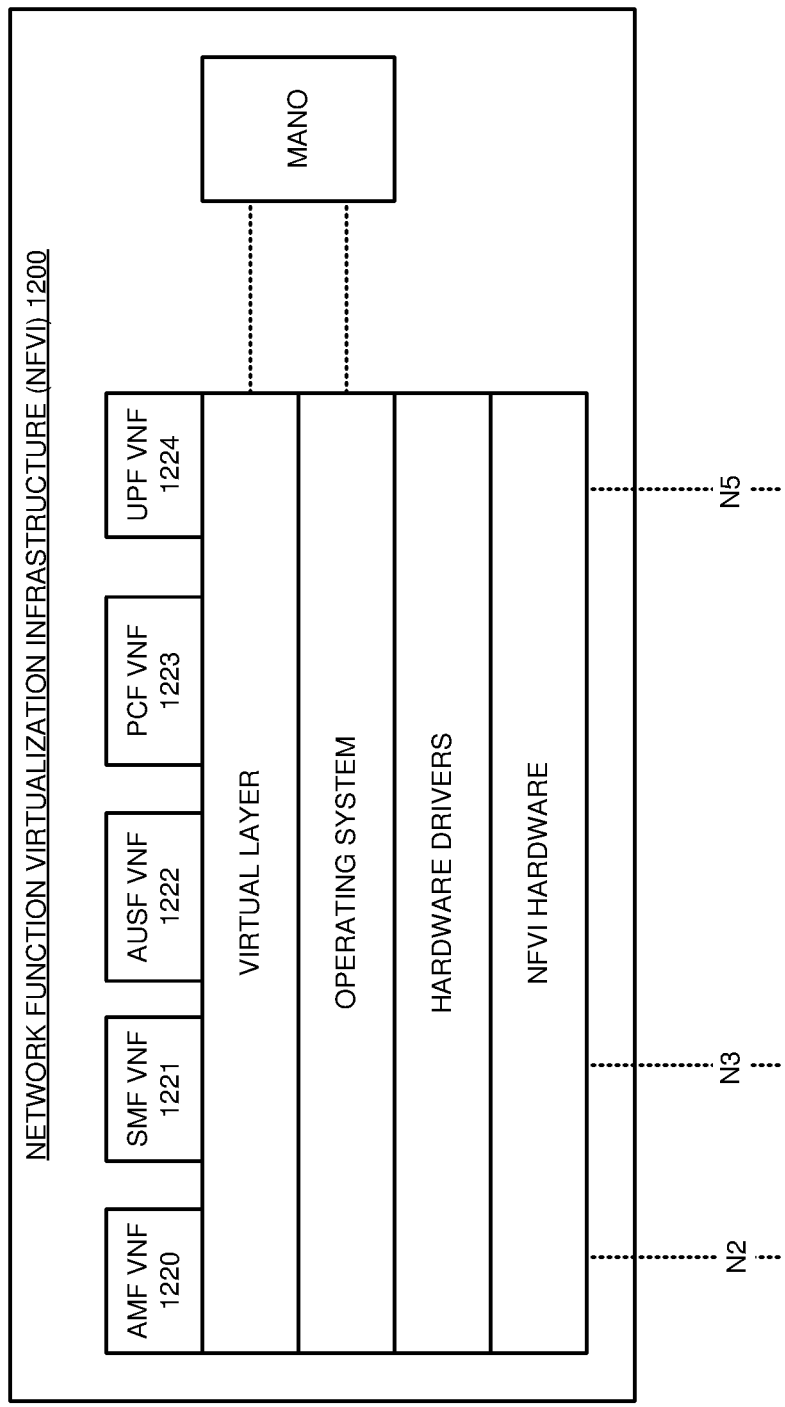
FIG. 12 illustrates a NFVI in the 5GNR network that serves the UEs with the low-latency QoS.

FIG. 12 illustrates NFVI 1200 in 5GNR network 900 that serves the 5GNR UE 901 with the low-latency QoS. NFVI 1200 comprises NFVI hardware, hardware drivers, operating system, virtual layer, Management and Orchestration (MANO), and Virtual Network Functions (VNFs) 1220-1224. NFVI 1200 executes the hardware drivers, operating system, virtual layer, MANO, and VNFs 1220-1224 to serve 5GNR UE 401. AMF 920 from FIG. 9 comprises AMF VNF 1220 and portions of the NFVI hardware, hardware drivers, operating system, and virtual layer. SMF 921 from FIG. 9 comprises SMF VNF 1221 and portions of the NFVI hardware, hardware drivers, operating system, and virtual layer. AUSF 922 from FIG. 9 comprises AUSF VNF 1222 and portions of the NFVI hardware, hardware drivers, operating system, and virtual layer. PCF 923 from FIG. 9 comprises PCF VNF 923 and portions of the NFVI hardware, hardware drivers, operating system, and virtual layer. UPF 924 from FIG. 9 comprises UPF VNF 1224 and portions of the NFVI hardware, hardware drivers, operating system, and virtual layer.

AMF VNF 1220 receives the UE ID and PLMN ID for 5GNR UE 901 from 5GNR gNodeB 910. AMF VNF 920 transfers the UE ID and PLMN ID for UE 901 to AUSF VNF 1222. AUSF VNF 1222 translates the UE ID and the PLMN ID for 5GNR UE 901 into a service name. SMF VNF 1221 translates the service name into an indicator for UPF VNF 1224. PCF VNF 1223 translates the UE ID, PLMN ID, and service name for UE 901 into a low-latency QoS. SMF VNF 1221 indicates the low-latency QoS for 5GNR UE 901 to UPF VNF 1224. AMF VNF 1220 transfers the low-latency QoS for 5GNR UE 901 to 5GNR gNodeB 910. UPF VNF 1224 receives user data for 5GNR UE 901 over an N5 link and transfers the user data to the SDAP in 5GNR gNodeB 910 over an N3 link.

AMF VNF 1220 receives multicast signaling for UE 901 from the RRC in 5GNR gNodeB 910 and transfers the multicast signaling to SMF VNF 1221 which transfers multicast signaling to UPF VNF 1224. In response to the multicast signaling, UPF VNF 1224 multicasts the N3 data for 5GNR UE 901 to 5GNR gNodeBs 910-914 over N3 links. AMF VNF 1220 receives handover signaling for 5GNR UE 901 from the RRC in 5GNR gNodeB 910 and transfers the handover signaling to SMF VNF 1221 which transfers handover signaling to UPF VNF 1224. In response to the handover signaling, UPF VNF 1224 terminates the multicast to 5GNR access nodes 910-914 and transfers the N3 data to target 5GNR gNodeB 911 over an N3 link per the low-latency QoS.

Figure 13:
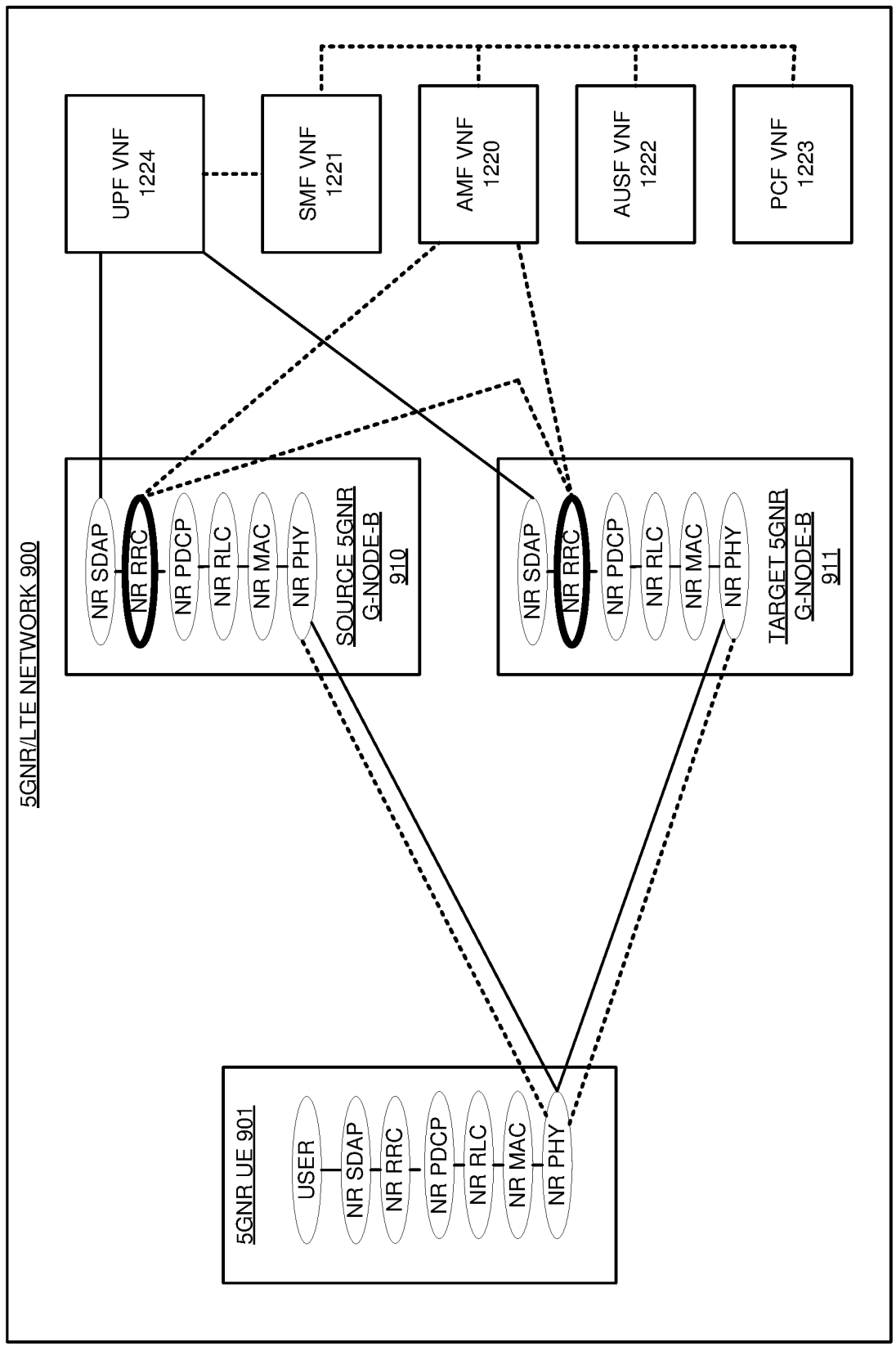
FIG. 13 illustrates the operation of the 5GNR network to serve the UEs with the low-latency QoS.

FIG. 13 illustrates the operation of 5GNR network 900 to serve UE 901 with the low-latency QoS. The 5GNR RRC in 5GNR UE 901 exchanges attachment signaling with the 5GNR RRC in source 5GNR gNodeB 910 over the 5GNR PDCP, RLC, MAC, and PHY layers. The 5GNR RRC in gNodeB 910 transfers attachment signaling to AMF VNF 1220. AMF VNF 1220 transfers attachment signaling to AUSF VNF 1222 and PCF VNF 1223. AUSF VNF 1222 translates the UE ID and the PLMN ID for 5GNR UE 901 into a service name. SMF VNF 1221 translates the service name into an indicator for UPF VNF 1224. PCF VNF 1223 translates the UE ID, PLMN ID, and service name for UE 901 into a low-latency QoS. SMF VNF 1221 indicates the low-latency QoS for 5GNR UE 901 to UPF VNF 1224. AMF VNF 1220 transfers the low-latency QoS for 5GNR UE 901 to the RRC in 5GNR gNodeB 910. The 5GNR RRC in 5GNR gNodeB 910 transfers instructions to create the QCI N bearer to the 5GNR MAC in 5GNR gNodeB 910. The RRC in 5GNR gNodeB 910 transfers instructions to create the QCI N bearer to the RRC in 5GNR UE 901 over the 5GNR PDCP, RLC, MAC, and PHY layers. UPF VNF 1224 receives user data for the 5GNR UE 901 over an N5 link and transfers the user data to the SDAP in 5GNR gNodeB 910 over an N3 link per the low-latency QoS. The SDAP in 5GNR gNodeB 910 transfers the user data to the SDAP in 5GNR UE 901 over the 5GNR PDCP, RLC, MAC, and PHY layers per the low-latency QoS. The 5GNR SDAP in 5GNR UE 901 transfers the user data to the user application.

The 5GNR RRC in 5GNR gNodeB 910 receives and processes measurement reports from the 5GNR RRC in 5GNR UE 901 that indicates received signal strength at UE 901 for source 5GNR gNodeB 910 and neighbor 5GNR gNodeBs 411-414. In response to the low-latency QoS for 5GNR UE 901, the 5GNR RRC in 5GNR gNodeB 910 identifies when the received signal strength at 5GNR UE 901 falls to a multicast trigger level. When the received signal strength at 5GNR UE 901 reaches the multicast trigger level, the RRC in 5GNR gNodeB 910 transfers multicast signaling to AMF VNF 1220 that indicates neighbor access nodes 911-914, and AMF VNF 1220 forwards the multicast signaling to SMF VNF 1221. SMF VNF 1221 transfers the multicast signaling to UPF 1224 that indicates neighbor 5GNR gNodeBs 911-914. In response to the multicast signaling, UPF 1224 multicasts the user data for 5GNR UE 901 to the 5GNR SDAPs in 5GNR access nodes 910-911. The SDAP in 5GNR gNodeB 910 continues to transfer the user data to the SDAP in 5GNR UE 401 over the PDCP, RLC, MAC, and PHY layers per the low-latency QoS.

The 5GNR RRC in 5GNR UE 901 determines radio metrics for 5GNR gNodeBs 910-904 and transfers measurement reports with the radio metrics to the 5GNR RRC in 5GNR gNodeB 910 over the PDCP, RLC, MAC, and PHY layers. The 5GNR RRC in 5GNR gNodeB 910 processes the measurement reports from 5GNR UE 901 to determine when the received signal strength at 5GNR UE 901 from source 5GNR gNodeB 910 reaches a handover trigger level. When the received signal strength at 5GNR UE 901 reaches the handover trigger level, the 5GNR RRC in 5GNR gNodeB 910 selects a target one of neighbor 5GNR gNodeBs 911-914 based on their signal strength at 5GNR UE 901. In this example, the 5GNR RRC in 5GNR gNodeB 910 selects target 5GNR gNodeB 911, but 5GNR gNodeBs 912-914 could be selected in other examples. The 5GNR RRC in 5GNR gNodeB 910 transfers handover signaling that indicates target 5GNR gNodeB 911 to AMF VNF 1220. The 5GNR RRC in 5GNR gNodeB 910 transfers handover signaling to the LTE RRC in 5GNR gNodeB 911.

AMF VNF 1120 transfers handover signaling to SMF 1221 which transfers handover signaling to UPF VNF 1224 to create a low-latency QoS bearer for 5GNR UE 901. UPF VNF 1224 terminates the multicast to gNodeBs 910-914 responsive to the handover signaling. AMF 1220 transfers handover signaling to the 5GNR RRC in target 5GNR gNodeB 911 to create a low-latency QoS bearer for 5GNR UE 901. The 5GNR RRC in target 5GNR gNodeB 911 transfers instructions for the low-latency QoS bearer to the 5GNR MAC. 5GNR UE 901 transfers RRC signaling to target 5GNR gNodeB 911 that indicates: UE ID, PLMN ID, QCI N, and received signal strength for 5GNR access nodes 910-914. The 5GNR RRC in 5GNR gNodeB 911 transfers low-latency QoS instructions to the RRC in 5GNR UE 901 over the PDCP, RLC, MAC, and PHY layers. UPF VNF 1224 receives user data for 5GNR UE 901 and transfers the user data to the SDAP in 5GNR gNodeB 911 per the low-latency QoS. The SDAP in 5GNR gNodeB 911 transfers the user data to the SDAP in 5GNR UE 901 over the PDCP, RLC, MAC, and PHY layers per the low-latency QoS.

In some examples, UPF VNF 1224 does not multicast the user data, but UPF VNF 1224 transfers the user data to the SDAP in 5GNR gNodeB 910. The SDAP in 5GNR gNodeB 910 multicasts the user data to the 5GNR SDAPs in 5GNR gNodeBs 911-914 over X2 links responsive to the multicast trigger. The 5GNR SDAP in 5GNR eNodeB 910 stops the multicast of the user data to 5GNR access nodes 911-914 in response to the handover trigger.

The wireless data network circuitry described above comprises computer hardware and software that form special-purpose wireless network circuitry to serve wireless UEs with a low-latency QoS. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to serve wireless UEs with a low-latency QoS.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a Fifth Generation New Radio (5GNR) network to serve User Equipment (UE) with low-latency Quality-of-Service (QoS), the method comprising:
 a source 5GNR access node wirelessly receiving attachment signaling from the UE and transferring the attachment signaling to a network controller;
 the network controller processing the attachment signaling and responsively determining the low-latency QoS for the UE and transferring network signaling to the source 5GNR access node and a network gateway indicating the low-latency QoS;
 the network gateway receiving user data for the UE and transferring the user data to the source 5GNR access node responsive to the network signaling;
 the source 5GNR access node wirelessly transferring the user data to the UE responsive to the network signaling, determining when received signal strength at the UE falls to a multicast trigger responsive to the low-latency QoS, and responsively transferring multicast signaling to the network controller when the received signal strength at the UE falls to the multicast trigger;
 the network controller transferring additional multicast signaling to the network gateway responsive to the multicast signaling from the source 5GNR access node;
 the network gateway multicasting the user data to the source 5GNR access node and to neighbor 5GNR access nodes responsive to the additional multicast signaling from the network controller;
 the source 5GNR access node determining when the received signal strength for the UE reaches a handover trigger and responsively selecting a target one of the neighbor 5GNR access nodes and transferring handover signaling to the network controller and the target one of the neighbor 5GNR access nodes when the received signal strength for the UE reaches the handover trigger;
 the network controller transferring additional handover signaling to the network gateway responsive to the handover signaling from the source 5GNR access node; and
 the network gateway terminating the user data multicast and transferring the user data to the target one of the neighbor 5GNR access nodes responsive to the additional handover signaling from the network controller.

2. The method of claim 1 wherein network controller determining the low-latency QoS for the UE comprises translating a network identifier from the UE into the low-latency QoS for the UE.

3. The method of claim 1 wherein network controller determining the low-latency QoS for the UE comprises translating a Public Land Mobile Network Identifier (PLMN ID) from the UE into the low-latency QoS for the UE.

4. The method of claim 1 wherein the network controller transferring the network signaling indicating the low-latency QoS comprises a Mobility Management Entity (MME) transferring the network signaling indicating a QoS Class Indicator (QCI) to a Long Term Evolution (LTE) eNodeB and an LTE Serving Gateway (S-GW).

5. The method of claim 1 wherein the source 5GNR access node wirelessly receiving the attachment signaling and transferring the attachment signaling comprises a Long Term Evolution (LTE) eNodeB wirelessly receiving the attachment signaling from the UE and transferring the attachment signaling to a Mobility Management Entity (MME).

6. The method of claim 1 wherein the source 5GNR access node determining when the received signal strength at the UE reaches a multicast trigger responsive to the low-latency QoS comprises a Long Term Evolution (LTE) eNodeB determining when the received signal strength at the UE reaches a multicast trigger responsive to the low-latency QoS.

7. The method of claim 1 wherein the source 5GNR access node transferring the multicast signaling to the network controller when the received signal strength at the UE reaches the multicast trigger comprises a Long Term Evolution (LTE) eNodeB transferring the multicast signaling to a Mobility Management Entity (MME) when the received signal strength at the UE reaches the multicast trigger.

8. The method of claim 1 wherein the network controller transferring the additional multicast signaling to the network gateway responsive to the multicast signaling from the source 5GNR access node comprises a Mobility Management Entity (MME) transferring the additional multicast signaling to a Serving Gateway (S-GW) responsive to the multicast signaling from a Long Term Evolution (LTE) eNodeB.

9. The method of claim 1 wherein the network gateway multicasting the user data to the source 5GNR access node and to the neighbor 5GNR access nodes responsive to the additional multicast signaling from the network controller comprises a Serving Gateway (S-GW) multicasting the user data to 5GNR gNodeBs responsive to the additional multicast signaling from a Mobility Management Entity (MME).

10. The method of claim 1 wherein:
the source 5GNR access node determining when the received signal strength at the UE falls to the multicast trigger comprises wirelessly receiving a measurement report from the UE; and
the source 5GNR access node determining when the received signal strength for the UE reaches the handover trigger comprises wirelessly receiving another measurement report from the UE.

11. A Fifth Generation New Radio (5GNR) network to serve User Equipment (UE) with low-latency Quality-of-Service (QoS) comprising:
a source 5GNR access node configured to wirelessly receive attachment signaling from the UE and transfer the attachment signaling to a network controller;
the network controller configured to process the attachment signaling and responsively determine the low-latency QoS for the UE and transfer network signaling to the source 5GNR access node and a network gateway indicating the low-latency QoS;
the network gateway configured to receive user data for the UE and transfer the user data to the source 5GNR access node responsive to the network signaling;
the source 5GNR access node configured to wirelessly transfer the user data to the UE responsive to the network signaling, determine when received signal strength at the UE falls to a multicast trigger responsive to the low-latency QoS, and responsively transfer multicast signaling to the network controller when the received signal strength at the UE falls to the multicast trigger;
the network controller configured to transfer additional multicast signaling to the network gateway responsive to the multicast signaling from the source 5GNR access node;
the network gateway configured to multicast the user data to the source 5GNR access node and to neighbor 5GNR access nodes responsive to the additional multicast signaling from the network controller;
the source 5GNR access node configured to determine when the received signal strength for the UE reaches a handover trigger and responsively select a target one of the neighbor 5GNR access nodes and transfer handover signaling to the network controller and the target one of the neighbor 5GNR access nodes when the received signal strength for the UE reaches the handover trigger;
the network controller configured to transfer additional handover signaling to the network gateway responsive to the handover signaling from the source 5GNR access node; and
the network gateway configured to terminate the user data multicast and transfer the user data to the target one of the neighbor 5GNR access nodes responsive to the additional handover signaling from the network controller.

12. The 5GNR network of claim 11 wherein network controller is configured to translate a network identifier from the UE into the low-latency QoS for the UE.

13. The 5GNR network of claim 11 wherein network controller is configured to translate a Public Land Mobile Network Identifier (PLMN ID) from the UE into the low-latency QoS for the UE.

14. The 5GNR network of claim 11 wherein the network controller comprises a Mobility Management Entity (MME) configured to transfer the network signaling indicating a QoS Class Indicator (QCI) to a Long Term Evolution (LTE) eNodeB and an LTE Serving Gateway (S-GW).

15. The 5GNR network of claim 11 wherein the source 5GNR access node comprises a Long Term Evolution (LTE) eNodeB configured to wirelessly receive the attachment signaling from the UE and transfer the attachment signaling to a Mobility Management Entity (MME).

16. The 5GNR network of claim 11 wherein the source 5GNR access node comprises a Long Term Evolution (LTE) eNodeB configured to determine when the received signal strength at the UE reaches the multicast trigger responsive to the low-latency QoS.

17. The 5GNR network of claim 11 wherein the source 5GNR access node comprises a Long Term Evolution (LTE) eNodeB configured to transfer the multicast signaling to a Mobility Management Entity (MME) when the received signal strength at the UE reaches the multicast trigger.

18. The 5GNR network of claim 11 wherein the network controller comprises a Mobility Management Entity (MME)

configured to transfer the additional multicast signaling to a Serving Gateway (S-GW) responsive to the multicast signaling from a Long Term Evolution (LTE) eNodeB.

19. The 5GNR network of claim 11 wherein the network gateway comprises a Serving Gateway (S-GW) configured to multicast the user data to 5GNR gNodeBs responsive to the additional multicast signaling from a Mobility Management Entity (MME).

20. The 5GNR network of claim 11 wherein:
the source 5GNR access node is configured to determine when the received signal strength at the UE falls to the multicast trigger comprises the source 5GNR access node configured to wirelessly receive a measurement report from the UE; and
the source 5GNR access node is configured to determine when the received signal strength for the UE reaches the handover trigger comprises the source 5GNR access node configured to wirelessly receive another measurement report from the UE.

* * * * *